(12) United States Patent
Kameyama et al.

(10) Patent No.: US 6,442,343 B2
(45) Date of Patent: Aug. 27, 2002

(54) EXPOSURE CONTROL DEVICE FOR CAMERA

(75) Inventors: Nobuyuki Kameyama; Shigeki Takahara; Yuji Mikami, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/863,295

(22) Filed: May 24, 2001

(30) Foreign Application Priority Data

May 25, 2000 (JP) ........................................ 2000-155355

(51) Int. Cl.[7] ........................ G03B 7/085; G03B 15/03; G03B 13/32
(52) U.S. Cl. ........................ 396/65; 396/144; 396/155; 396/179; 396/257; 396/315; 396/510
(58) Field of Search ................................ 396/144, 179, 396/170, 155, 505, 508, 258, 257, 166, 167, 176, 510, 65–70, 315

(56) References Cited

U.S. PATENT DOCUMENTS 2,956,491 A * 10/1960 Fischer et al. .......... 396/257 X
4,316,658 A * 2/1982 Bundschuh .................. 396/65
5,930,543 A * 7/1999 Tseng et al. ................. 396/505

* cited by examiner

Primary Examiner—W. B. Perkey
(74) Attorney, Agent, or Firm—Young & Thompson

(57) ABSTRACT

A first stop plate with a small stop opening is disposed behind a taking lens, and a second stop plate with a middle stop opening is disposed between a first and second lens, which comprise the taking lens. Upon moving a changeover knob to an ON position, a flash unit and the second stop plate are actuated such that the middle stop opening is retracted from an photographic light path PL. The small stop opening is retracted from the photographic light path PL when subject luminance is less than a predetermined value. In high-luminance condition, the small stop opening and the middle stop opening are set on the photographic light path PL, and in middle-luminance condition, the small stop opening is retracted. In low-luminance condition, the middle stop opening is retracted by operation of the changeover knob, so only a large stop opening is set on the photographic light path PL.

19 Claims, 17 Drawing Sheets

FIG.15A
ST-OFF LV ≥ 10.8 (f/22)
FIG.15B
ST-OFF LV < 10.8 (f/11)
FIG.15C
ST-ON LV ≥ 10.8 (f/22)
FIG.15D
ST-ON LV < 10.8 (f/5.6)
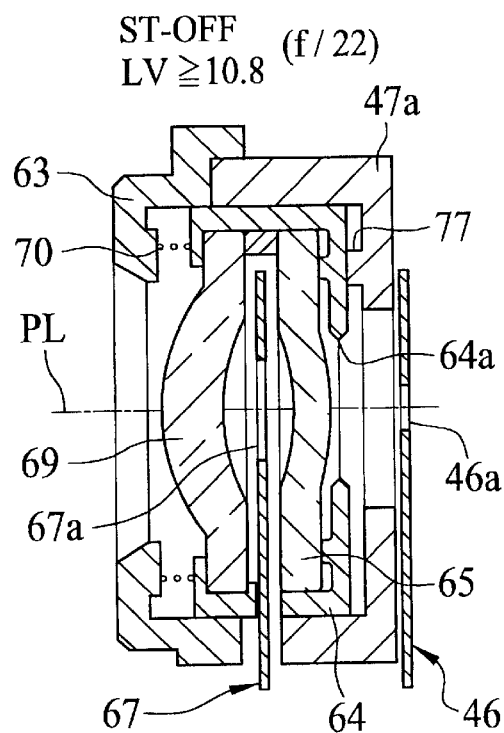
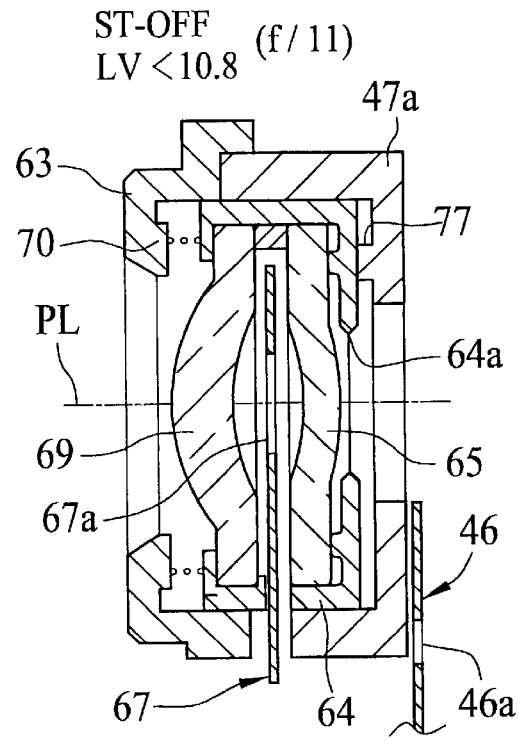
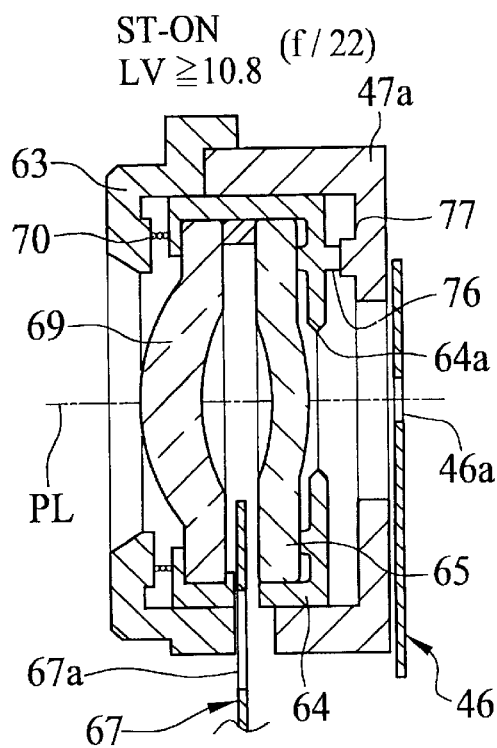
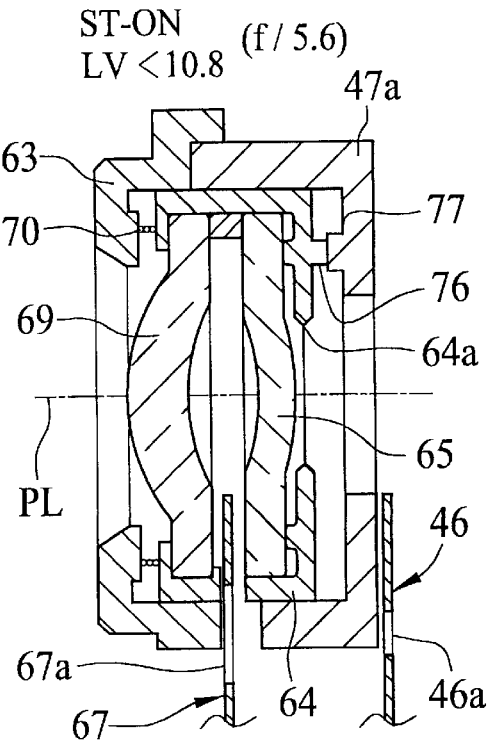

ST-OFF
LV ≧ 10.8   (f/22)

ST-OFF
LV < 10.8   (f/11)

ST-ON
LV ≧ 10.8   (f/22)

ST-ON
LV < 10.8   (f/5.6)

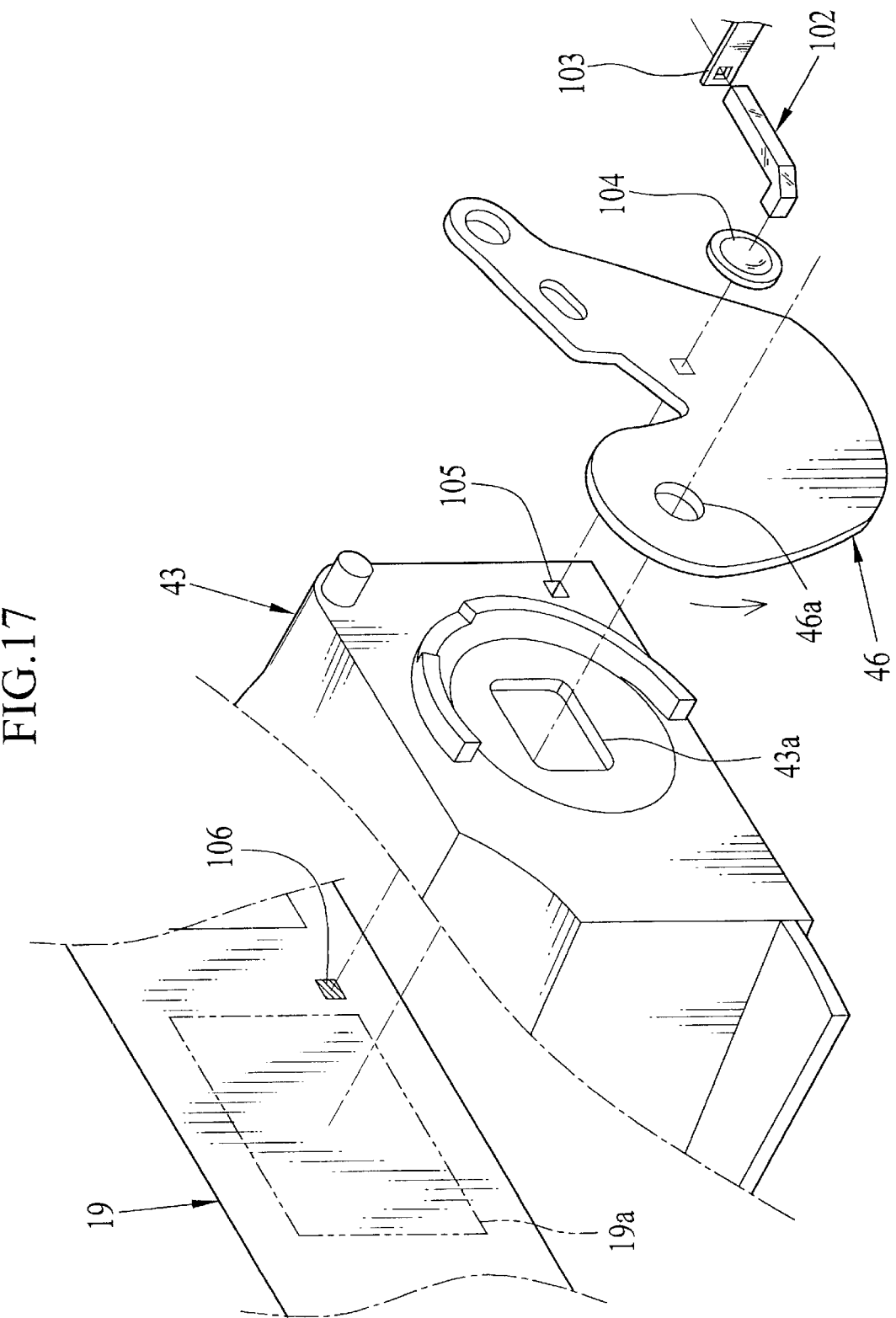

ST-OFF LV ≥ 10.8 (f/22)

ST-OFF LV < 10.8 (f/11)

ST-ON LV ≥ 10.8 (f/22)

ST-ON LV < 10.8 (f/5.6)

EXPOSURE CONTROL DEVICE FOR CAMERA

BACKGROUND OF THE INVENTION

1. Field of the Invention

The present invention relates to an exposure control device for camera, which is capable of controlling exposure amount by changing over aperture size in three steps according to subject luminance.

2. Background Arts

A lens-fitted photo film unit (hereinafter referred to as film unit) is well-known as a simple camera which is loaded with an unexposed photo filmstrip, and in which a simple exposure mechanism is incorporated. In order to lower the manufacturing cost, the film unit is provided with a shutter blade of knocked type, so the shutter speed is fixed at a predetermined value. Also, the film unit is provided with a taking lens of fixed-focus type. To ensure pan-focus by use of such a taking lens, aperture size is designed to be relatively small, compared to other camera like a compact camera. Moreover, for the purpose of miniaturization of the film unit, a main capacitor of an internal flash unit has relatively small capacitance, so light amount of flash light is smaller that that of other cameras.

The film unit has such a characteristic that everyone can photograph easily at any time and situation, so the film unit is targeted amateur users who are not familiar with operation of a camera. In addition, the film unit is presumed to be used in a condition ranged from a low luminance level such as indoor photography (light value LV is about 5.5), to a high luminance level such as fine outdoor photography (light value LV is about 15). In order to obtain adequate exposure amount in various conditions of wide luminance range, it is considered to use a photo filmstrip with high film speed such as ISO 1600 type or ISO 3200 type.

Moreover, for the purpose of photography with proper exposure amount under various conditions of wide luminance range, it is considered to provide a film unit with an exposure control device for adjusting exposure amount in accordance with subject luminance by changing over aperture sizes in two steps. There are two types of exposure control devices, one is an automatic type for changing over aperture size automatically, and the other is an interlocked type in which aperture size is changed over in accordance with operation of flash switch.

The exposure control device of automatic type has a photometry element such as a cadmium sulfide (CdS) or a photo diode. When the subject luminance is equal to or more than a predetermined level, the exposure control device moves a stop changeover plate automatically to insert a small stop opening, smaller than a normal one, on an photographic light path PL. The exposure control device of automatic type is used for decreasing exposure amount by setting the small stop opening on the photographic light path PL, to prevent over exposure in the high luminance level.

The exposure control device of interlocked type has a changeover plate that moves subsidiary to the movement of the flash switch. When the flash switch is moved to an ON position, the stop changeover plate is moved to insert a large stop opening, larger than the normal one, on the photographic light path PL. The exposure control device of interlocked type is used for preventing under exposure in photography in the low luminance level. As mentioned above, the film unit has a main capacitor of small capacitance and a small-size stop opening, so under exposure is likely to occur in photographing a subject of the low luminance level. It is assumed to turn on the flash device in a low luminance condition, so the exposure control device of interlocked type is designed to set the large stop opening to increase exposure amount when the flash switch is moved to the ON position.

In the exposure control device of automatic type, however, when the size of the stop opening, chosen in a low luminance condition, is enlarged for the purpose of preventing under exposure, there is a problem to make the depth of field smaller, which causes lack of focus. On the other hand, the exposure control device of interlocked type, it is not possible to conduct daylight synchronized flash photography that is effective in photography against the sun, since extremely over exposure is happened by flash photography in daylight condition. Turning on a flash unit in the high luminance level surely causes over exposure. This problem becomes worse especially in using a photo filmstrip of high film speed.

In a middle luminance level (light value LV is from 8 to 13), such as an outdoor photography in an evening, an indoor photography under relatively bright light, and a daylight photography in cloudy or rainy condition, there are a first luminance range in which flash light is needed, and a second luminance range in which flash light is unnecessary. The border of these two ranges is changed subtly in accordance with aperture setting or the like. Thus, it is difficult to judge whether or not to use a flash unit. In addition, the flash switch of the film unit is usually operated manually, so judgment to use the flash unit is left to a user.

In the middle luminance level, failure judgment or operation is likely to cause over or under exposure even when the exposure control devices of both type are applied. It is difficult in the middle luminance level to judge whether or not the flash unit is required, so the user may judge that the flash photography is not necessary, although flash light is practically required. That is, there is a gap between a luminance level where the user needs flash light, and a luminance level to require flash light theoretically.

In order to prevent over exposure in the high luminance level, the exposure control device of automatic type is designed to set the small stop opening on the photographic light path PL, so the stop opening of normal size is usually set in the middle luminance level. In that case, flash photography may cause over exposure dependent upon subject luminance, in the middle luminance level. On the other hand, the exposure control device of interlocked type is designed such that a large stop opening is not set on the photographic light path PL unless the flash switch is not located at ON position. Thus, in the middle luminance level where flash light is needed, if the user forgets moving the flash switch or judges that flash light is unnecessary, under exposure may be happened.

Frequency of photographing a subject of middle luminance level is not quite a few, so it is desirable to carry out proper exposure control easily and surely in the middle luminance level. In addition, in consideration of the characteristic of the film unit that everyone can take a photo readily, to force an user a difficult judgment is not preferable, since it causes worse management of the film unit.

SUMMARY OF THE INVENTION

In view of the foregoing, an object of the present invention is to provide an exposure control device for camera that is capable of proper photography in wide luminance range from a low luminance level to a high luminance level.

To achieve the above objects, an exposure control device for a camera, having an open aperture set on a photographic light path, is comprised of a first stop member with a small stop opening that is smaller than the open aperture, a second stop member with a middle stop opening that is larger than the small stop opening and smaller than the open aperture, photometry means for measuring subject luminance, first stop changeover means for moving the first stop member, and second stop changeover means for moving the second stop member. The first stop member is movable between a small aperture position where the small stop opening is set on the photographic light path, and a first large aperture position where the small stop opening is retracted from the photographic light path. The second stop member is movable between a middle aperture position where the middle stop opening is set on the photographic light path, and a second large aperture position where the middle stop opening is retracted from the photographic light path. The first stop changeover means sets the first stop member either said small aperture position or the first large aperture position in accordance with subject luminance measured by the photometry means. The second stop changeover means sets the second stop member either the middle aperture position of the second large aperture position in accordance with selecting operation to determine whether or not to carry out flash photography.

In the preferred embodiment, the camera has a taking lens, which includes a plurality of lens elements. One of the first stop member and the second stop member is disposed between the lens elements, and the other stop member is disposed behind the taking lens. The taking lens is movable between a short-distance position where the subject distance is ranged from 1.5 m to 2 m, and a long-distance position where the subject distance is ranged from 4.5 m to 7 m. The taking lens is set at said short-distance position in choosing flash photography, and set at long-distance position when flash photography is not selected.

The second stop member is retained at the middle aperture position, and the second stop changeover means moves the second stop member to the second large aperture position in accordance with operation to drive a flash unit. The first stop member is kept at the small aperture position, and the first stop changeover means moves the fist stop member to the first large aperture position when subject luminance is less than a predetermined value. The photometry means is driven by shutter release operation.

The camera is a lens-fitted photo film unit having a photo filmstrip and a shutter device of same shutter speed. The film speed of the photo filmstrip is more than ISO 1600. The f-number of the open aperture is set within a range of 4.0 to 5.6, the f-number of the middle stop opening is set within a range of 8 to 11, and the f-number of the small stop opening is set within a range of16 to 27. The predetermined level of subject luminance is determined within a range of 10.5 to 11.5 in light value. The lens-fitted photo film unit has recording means for recording open-aperture information on a marginal area of a corresponding frame of said photo filmstrip.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein:

FIGS. 15A to 15D are sectional views of the lens unit;

FIG. 17 is a partial perspective view of a data exposure device;

DETAILED DESCRIPTION OF THE EMBODIMENT

Figure 1:
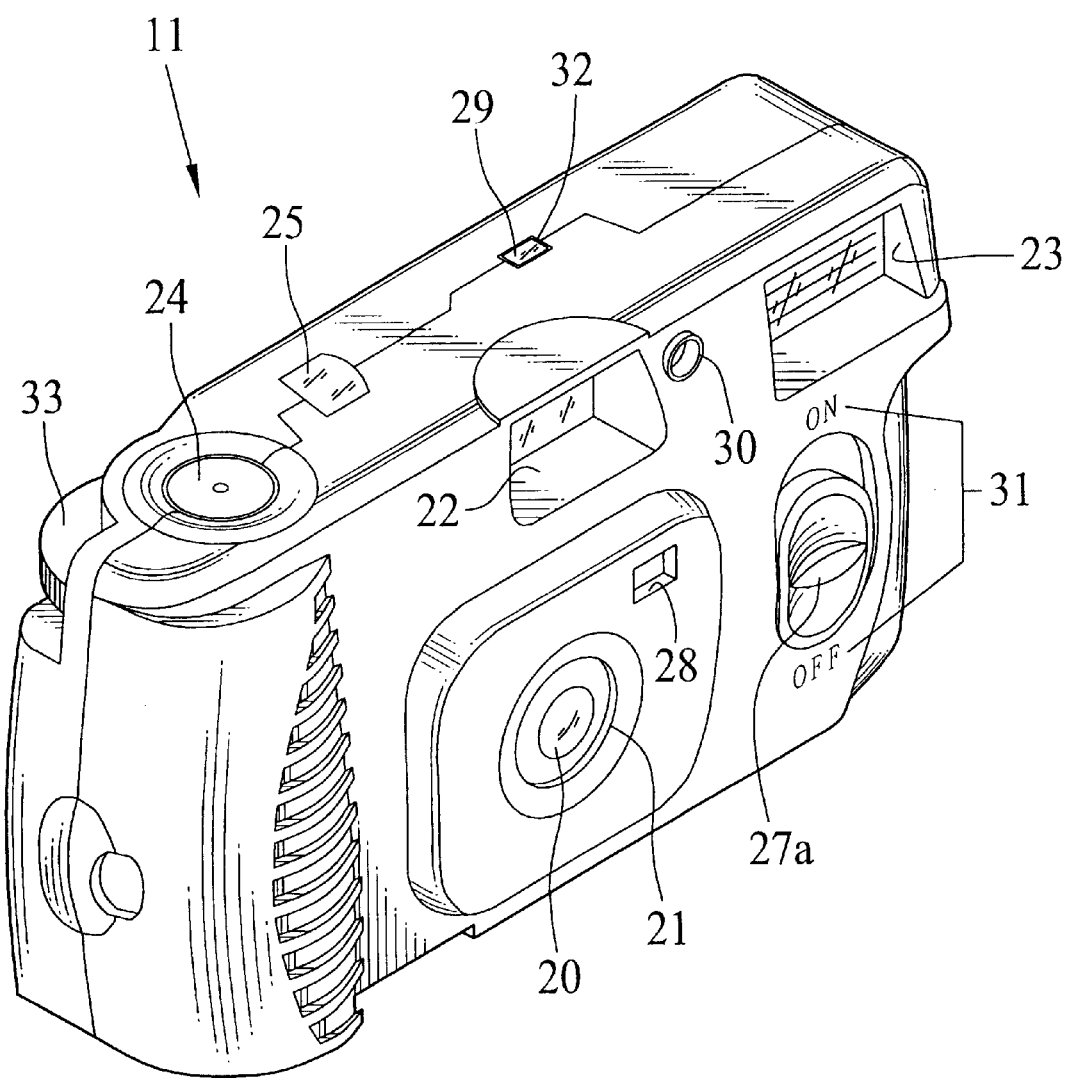
FIG. 1 is a perspective view of a lens-fitted photo film unit having an exposure control device of the present invention.
Figure 2:
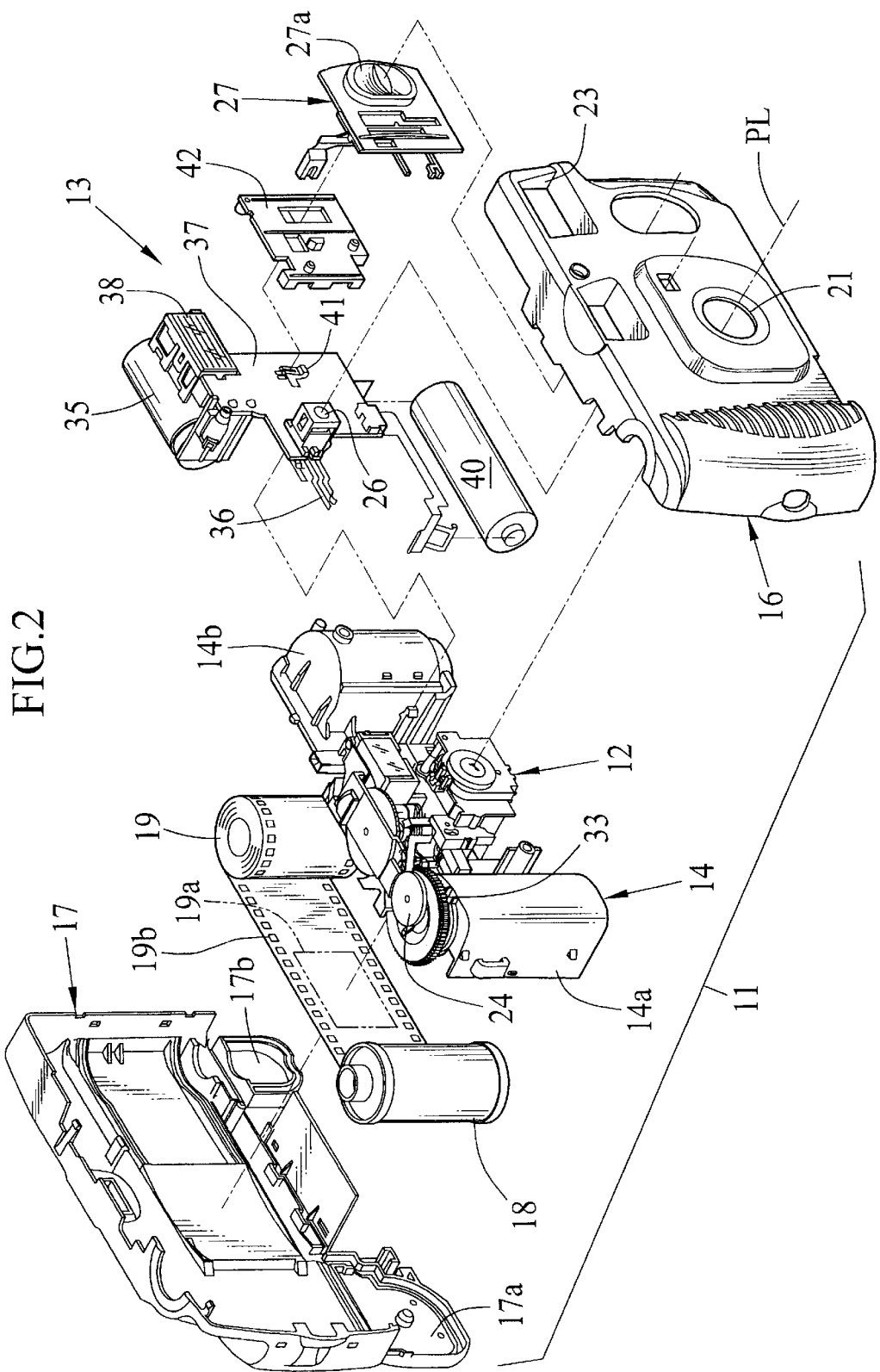
FIG. 2 is an exploded perspective view of the film unit of FIG. 1.

In FIGS. 1 and 2, a perspective and configuration of a film unit is depicted. The film unit 11 is comprised of a main body 14, a front cover 15, a rear cover 16, a film cartridge 18 and a photo filmstrip 19. An exposure unit 12 is provided with a middle portion of the main body 14, and a flash unit 13 is assembled beside the exposure unit 12. The film cartridge 18 and the photo filmstrip 19 are respectively contained in a cartridge chamber 14a and a film chamber 14b, which is provided with the main body 14. The photo filmstrip 19 is drawn out from the cartridge 18, and contained in the film chamber 14a in a rolled manner during manufacturing the film unit 11.

A front side of the front cover 16 for covering a front portion of the main body 14 is provided with a taking window 21 for exposing a taking lens 20, a viewfinder objective window 22, a photometry window 28 for exposing a CdS element 26, an opening for exposing a changeover knob 27a, and a photo receiving window for controlling flash light amount. The rear cover for covering a rear portion of the main body 14 is integrated with a pair of bottom lids 17a, 17b for covering bottom sides of the cartridge chamber 14a and the film chamber 14b. The rear lid 14a is released in unloading the film cartridge 19 with exposed photo filmstrip 19. An opening for exposing a shutter release button 24, a film counter window 25 and a charged state indicator window 32 for exposing a light guide 29 are formed in top sides of the front and rear covers 16, 17.

A winding wheel 33 is provided on an upper side of the cartridge chamber 14a. On the bottom of the winding wheel 33 is provided with a winding axis for engaging with a spool of the film cartridge 18. By rotating the winding wheel 33 in each photography, the photo filmstrip 19 is wound into the film cartridge 18. When the photo filmstrip is wound by one frame, a shutter device assembled in the exposure unit 12 is charged for photography, and the winding wheel 33 is locked for preventing the photo filmstrip 19 from further winding.

The photo filmstrip 19 has a speed of ISO 3200. The photo filmstrip 19 with high film speed enables photography in wide luminance range from a low luminance level, such as an indoor photography (light value LV is about 5.5), to a high luminance level such as an outdoor photography in fine condition (light value LV is about 15). In this embodiment, a photo filmstrip of 135 size is used, but IX 240 type photo filmstrip may be used.

The flash unit 13 includes a main capacitor 35, a synchronous switch 36, an oscillation transformer, a flash emitter 38 having a flash discharge tube and a reflector, a battery 40 and a charger switch 41. These circuit elements are mounted on a circuit board 37, on which circuit patterns are printed. The circuit board 37 is provided with a flash circuit, a photometry circuit. The circuit board 37 is also provided with a flash light control circuit for receiving reflected flash light, and for stopping emission of flash light at the time when received light amount reaches up to a predetermined value.

In front of the circuit board 37 through a middle plate 42 is provided a operation member 27 for turning on and off the flash circuit, changing over aperture size, and moving the taking lens 20 back and forth. The operation member 27 is disposed is movable up and down, and has the changeover knob 27a. When a user slides the changeover knob 27a, the operation member 27 is moved up and down.

The operation member 27 is changeable between an OFF position and an ON position, which are indicated by indicators 31. When the operation member 27 is located at the OFF position, the flash circuit is not driven. On the other hand, when the operation member 27 is moved to the ON position, the charger switch 41 is depressed by a switch projection (not shown) formed behind the operation member 27, so the flash circuit is driven to charge the main capacitor 35. Moreover, the operation member 27 is mechanically interlocked with a second stop plate 67. Upon moving the operation member 27 to the ON position, the second stop plate 67 is moved to change aperture size. The operation member 27 is also mechanically interlocked with a lens holding frame 64 for holding the taking lens 20. The taking lens 20 moves forward subsidiary to the movement of the operation member 27 to the ON position.

The flash circuit is comprised of the main capacitor 35, a trigger capacitor, an oscillation transistor, the oscillation transformer and so forth. When the operation member 27 is moved to the ON position, the flash circuit is turned on to drive the oscillation transistor and the oscillation transformer. A secondary current from the oscillation transformer is conducted through the main capacitor 35 and the trigger capacitor to charge them. When the main capacitor 35 is fully charged, a neon lamp (photo emission diode is also applicable) is turned on, and the light of the neon lamp is emitted upward through the light guide, to indicate the completion of the charging operation. By shutter release operation, the synchronous switch 36 is turned on to discharge the trigger capacitor, which causes to conduct a current from the main capacitor 35 through the flash discharge tube. Thereby, flash light is emitted from the flash emitter 38.

The exposure unit 12 includes a light-shielded tunnel 43 (See FIG. 3), on which a shutter device, film counter, etc., are assembled. The exposure unit 12 also holds an objective lens and an eyepiece lens for comprising a viewfinder unit. In the rear surface of the light-shielded tunnel 43 is formed an exposure aperture, which is located in front of the photo filmstrip 19 and determines an exposure area 19a of one frame.

Figure 3:
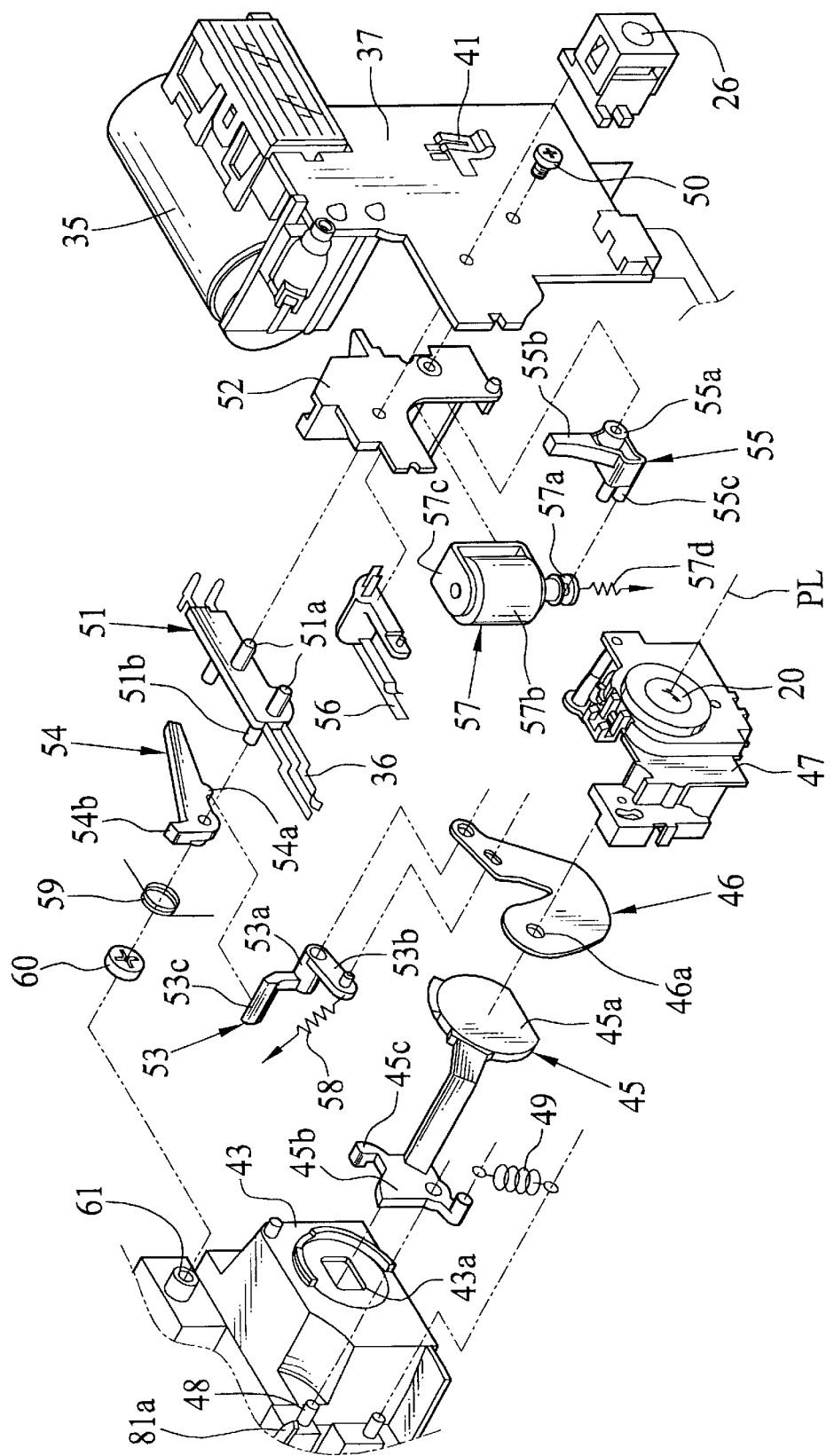
FIG. 3 is an exploded perspective view of an exposure unit.

In FIG. 3, a shutter opening 43a is formed in a front surface of the light-shielded tunnel 43. A shutter blade 45, a first stop plate 46 and a shutter cover 47 are assembled to the front side of the light-shielded tunnel 43. The shutter blade 45 is well-known as a knocked type, and includes a blade portion 45a and a shutter driving portion 45b. The shutter blade 45 is rotatable on the light-shielded tunnel 43 about a pin 48 that is formed on a front side of the light-shielded tunnel 43 and inserts an axial hole formed in the shutter driving portion 45b.

A tension spring 49 is hooked on the light-shielded tunnel 43 and the shutter driving portion 45b. The tension spring 49 biases the shutter blade 45 to a close position where the blade portion 45a covers the shutter opening 43a. When the shutter release button 24 is depressed, the shutter device is actuated. Then, an end portion of the shutter driving portion 45b is knocked by a shutter drive lever 81. Then, the shutter blade 45 rotates toward an open position to expose the shutter opening 43a completely. Thereafter, the shutter blade is rotated toward the close position by the bias of the tension spring 49. A shutter speed is predetermined. In this embodiment, the shutter speed is $1/100$ sec.

The shutter driving portion 45a has a switch portion 45c for contacting the synchronous switch 36. When the shutter blade 45 reaches the open position, the switch portion 45c presses the synchronous switch 36, which is turned on. One end of the synchronous switch 36 is secured to a base member 51 that is extended in a lateral direction of the film unit 11. On the front side of the base member 51 is provided a pair of bosses 51a, which are inserted into the circuit board 37 through a support member 52, so the synchronous switch 36 is determined the position in the circuit board 37, and soldered thereon. The support member 52 is provided for retaining kinds of elements for comprising an exposure control device, and is secured to the rear side of the circuit board 37 by a screw 50.

The first stop plate 46 has a rough L-shape, and is formed a small stop opening 46a. The first stop plate 46 is rotatable between an insert position where the small stop opening 46a is on the photographic light path PL, and a retract position where the small stop opening 46a is away from the photographic light path PL. The first stop plate 46 is set at either the insert position or the retract position by an automatic stop changeover device, according to subject luminance measured by a photometry unit. Between the shutter blade 45 and the first stop plate 46, there is a guide member for preventing interference of the shutter blade 45 and the first stop plate 46.

The automatic stop changeover device includes a first stop lever 53, a stop changeover lever 54, a stopper 55, a photometry switch 56 and a solenoid 57. The first stop lever 53 has a pivot 53*a*, an installation portion 53*b* and a contact portion 53*c*. The first stop lever 53 is rotatable about the pivot 53*a*. The first stop plate 46 is fixed on the installation portion 53*b*. The first stop plate 46 is biased toward the insert position (in the clockwise direction) by a spring 58 attached to the first stop lever 53. The contact portion 53*c* is protruded upward from an end portion of the pivot 53*a*, and comes in contact with the stop changeover lever 54.

The stop changeover lever 54 has a pressing portion 54*a* that is protruded below and presses the first stop lever 53, and a receiving projection 54*b* that is engaged with a charge lever 83. The stop changeover lever 54 is rotatable on the base member 51 about a boss 51*b* formed behind the base member 51. The boss 51*b* is inserted in a engaging hole 16 formed on a base portion 19 through a torsion coil spring 59 and a holder 60.

The stop changeover lever 54 is biased in the clockwise direction by the torsion coil spring 59, which causes the pressing portion 54*a* to press the first stop lever 53. Biasing force of the torsion coil spring 59 is stronger than that of the spring 58 for biasing the first stop plate 46, so the first stop plate 46 can rotate toward the retract position (in the counterclockwise direction) against the bias of the spring 58.

The stopper 55 is disposed below an end portion of the stop changeover lever 54. The stopper 55 includes a pivot 55*a*, a projection 55*b* extended upward, and an interlock portion 55*c* provided on an rear side. The stopper 55 is rotatable on the support member 52 about a pin (not shown) that is provided on a rear surface of the support member 52. The interlock portion 55*c* is engaged with a core of the solenoid 57 that is disposed behind the stopper 55. The stopper 55 is located so as to rotate in a same plane as the rotation plane of the stop changeover lever 54, and is rotatable between a retain position where the interlock portion 55*c* is inserted in a rotational orbit of the stop changeover lever 54 to prohibit its rotation, and a non-retain position where the interlock portion 55*c* is away from the orbit to allow the rotation of the stop changeover lever 54.

The solenoid 57 includes a core 57*a*, a coil 57*b*, a retaining frame 57*c* for holding the coil 57*b*, and a spring 57*d*. The retaining frame 57*c* is fixed on the support member 52 by a pair of holding claw (not shown) that is formed on the support member 52. The core 57*a* is slidable up and down in the coil 57*b*, and is biased downward by the spring 59*d*. The solenoid 57 is designed to generate electromagnetic power to pull the core 57 inside of the coil 57*a* when a current is conducted through the coil 57*b* from the photometry circuit. The photometry circuit conducts a current through the coil 57*b* in accordance with subject luminance measured by means of the CdS element 26. The CdS element 26 is well-known as a photoconductive element that is changed its resistance value in accordance with luminance of received light. The CdS element 26 is positioned by a pair of bosses 51*a* of the base member 51, and is soldered on the circuit board 37.

The photometry circuit is comprised of the CdS element 26, switching transistor, the solenoid 57 and so forth, and is automatically driven to measure subject luminance at the time when the photometry switch 56, mounted on the circuit board 37, is turned on. When light value LV of measured subject luminance is less than 10.8, the switching transistor is turned on to conduct a current through the coil 57*b*, so that the core 57*a* is pulled inside of the coil 57*b*. Then, the stopper 55 is moved to the non-retain position from the retain position. The stop changeover lever 54 is allowed its rotation, and presses the first stop lever 53 by the bias of the torsion coil spring 59. Thereby, the first stop plate 46 is moved to the retract position by the first stop lever 53. Light value LV to drive the solenoid 57 (predetermined luminance level) is set as 10.8, but this value may be changed in accordance with an aperture size. The first stop plate 46 may be designed to be retained in the retract position, and to move toward the insert position when subject luminance is equal or more than a predetermined level.

Figure 4:
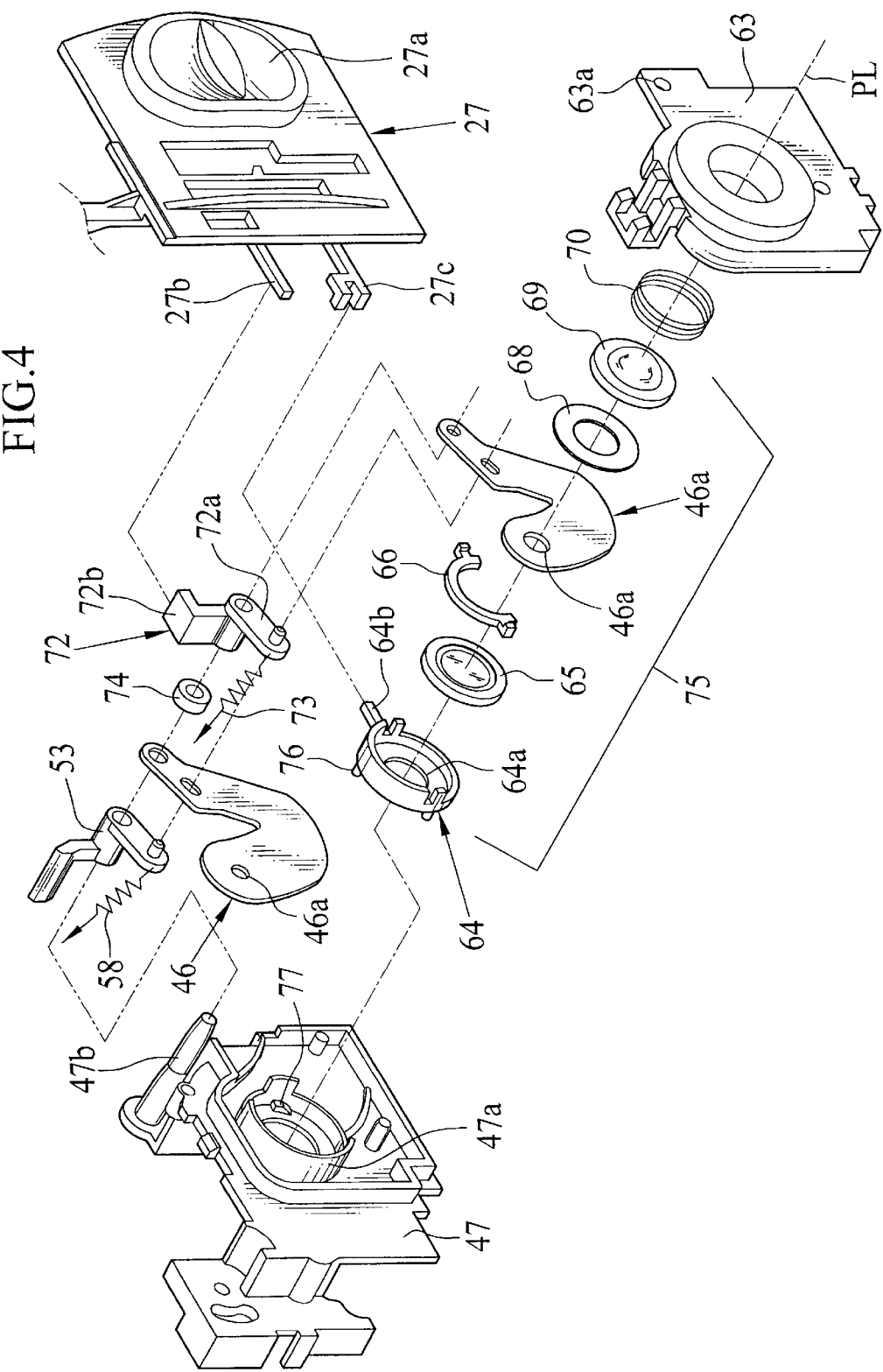
FIG. 4 is an exploded perspective view of a lens unit.

In FIG. 4, the shutter cover 47 includes a lens holder 47*a* for containing the taking lens 20, and a shaft 47*b* for retaining the stop plates. A front portion of the shutter cover 47 is covered with a lens holder 63. Between the shutter cover 47 and the lens holder 63, there are lens holding frame 64, a rear lens 65, a spacer 66, a second stop plate 67, a flare stopper 68, a front lens 69 and a tension spring 70, which are arranged in this order from the shutter cover 47.

The second stop plate has a middle stop opening 67*a*, which is larger than the small stop opening 46*a*. The second stop plate 67 is fixed on an installation portion 72*a* of a second stop lever 72. The second stop plate 67 and the second stop lever 72 are rotatable about the shaft 47*b*. The second stop plate 67 is retained at an insert position, where the middle stop opening 67*a* is on the photographic light path PL, by a bias of a spring 73 that is attached to the second stop lever 72.

The second stop lever 72 has a contact portion 72*b* for contacting a pressing lever 27*b* that is formed on the operation member 27. When the operation member is moved to the ON position, the pressing lever 27*b* presses the contact portion 72*b* upward. Then, the second stop lever 72 is rotated in the counterclockwise direction against the bias of the spring 73. Thereby, the second stop plate is also rotated in the counterclockwise direction, and is located at a retract position where the middle stop opening 67*a* is away from the photographic light path PL. That is, movement of the operation member 27 to the ON position sets the second stop opening 67 at the retract position, regardless of subject luminance. The second stop lever 72 and the pressing lever 27*b* comprise a manual stop changeover device for moving the second stop plate 67.

The first stop lever 53 and the first stop opening 46 are also rotatable about the shaft 47*b* for retaining the second stop lever 72. The shaft 47*b* is inserted into a engaging hole 63*a* formed in the lens cover 63, to prevent the second stop plate 67 from being out of place. The reference numeral 74 is a holder for preventing interference between the first and second stop levers 53, 72. The first and second stop plates 46, 67 are regulated their rotations by stoppers (not shown).

The taking lens 20 is comprised of the front and rear lenses 69, 65, and the second stop plate 67 is positioned therebetween. The front lens 69, the rear lens 65, the spacer 66 and the flare stopper 68 are contained in the lens holding frame 64. A front marginal portion of the front lens 69 is caulked by the lens holding frame 64, to provide a lens unit 75. The lens unit 75 is contained in the lens holder 47*a*, and is biased backward by the tension spring 70.

The lens holding frame 64 has a large stop opening 64*a* that is larger than the middle stop opening 67*a*. A pair of guide groove for holding the spacer 66 are formed in both lateral side of the lens holding frame 64. On the rear surface of the lens holding frame 64 are provided three cam pins 76, which are located symmetrically with respect to the direction of rotation about the photographic light path PL.

Respective cam pins 76 is corresponded to respective three cam members 77 provided on inner wall of the lens holder 47a. One end of the cam member 77 is tapered off, so the cam pin 76 is able to rotate along the tapered surface of the cam member 77.

A lens moving lever 27c is provided below the pressing lever 27b. The lens moving lever 27c has a two-forked end portion, and a connection lever 64b of the lens holding frame 64 is put into the two-forked end portion. Thus, the connection lever 64b is moved up and down together with the lens moving lever 27c. When the operation member 27 is moved to the ON position, the lens moving lever 27c and the connection lever 64b move upward, so the taking lens 20 and the lens holding frame 64 rotate in the counterclockwise direction. Then, the cam pins 76 rotate along the tapered surface of the cam members 77, and come in contact with the top surfaces of the cam members 77. Thereby, the lens unit 75 moves forward in the photographic light path PL against the bias of the tension spring 70. That is, movement of the operation member 27 to the ON position forces the taking lens 20 to locate at a short distance position where the subject distance of the taking lens 20 is from 1.5 m to 2.0 m, from a long distance position where the subject distance of the taking lens 20 is from 4.5 m to 7.0 m. Bottom portions of the lens holding frame 64 and the spacer 66 are formed cutouts for inserting the second stop plate 67. The lens holding frame 64 and the spacer 66 are rotated when the taking lens 20 moves back and forth, so the widths of cutouts of the lens holding frame 64 and the spacer 66 are larger than the width of the second stop plate 67.

Figure 5:
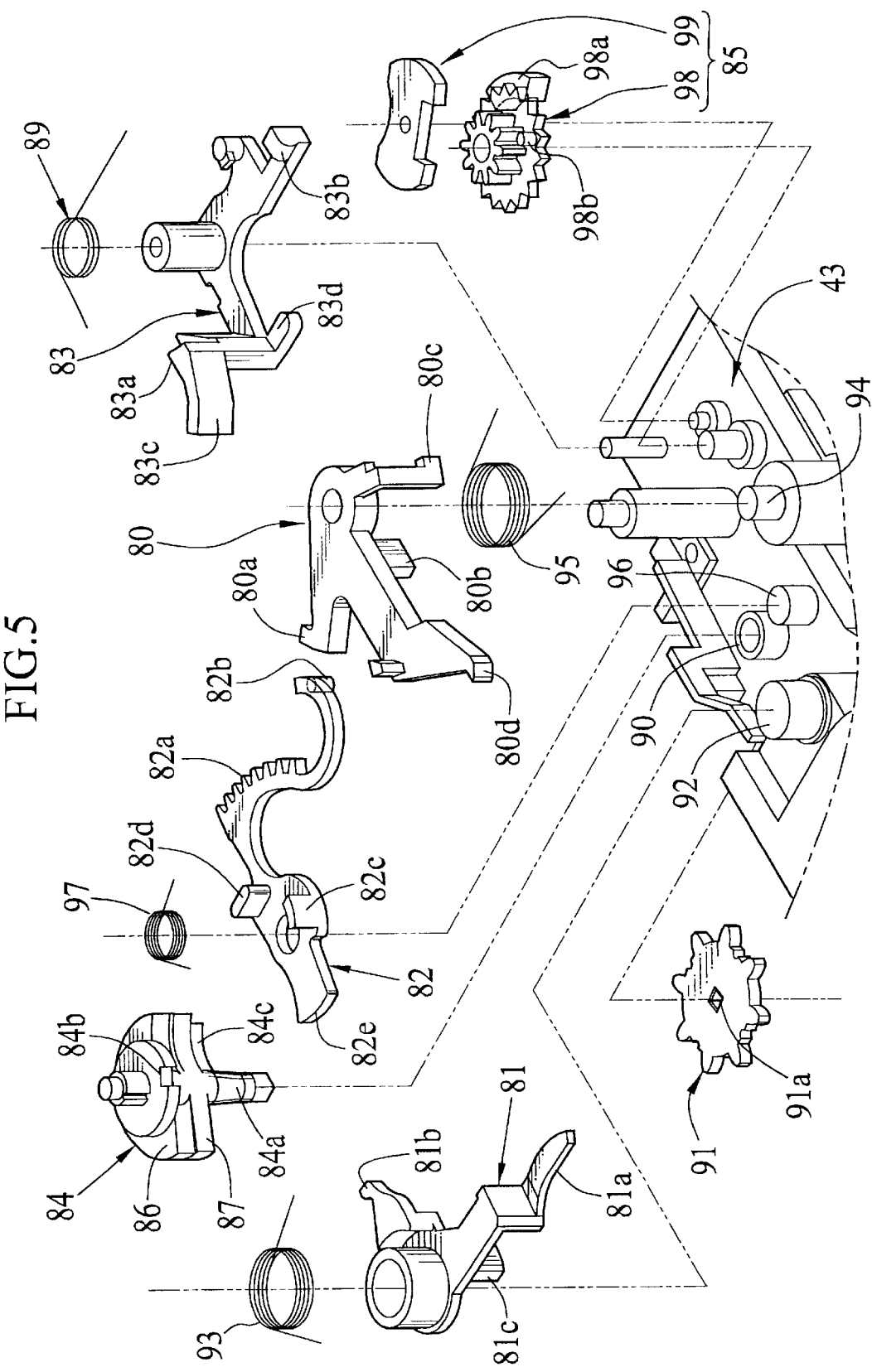
FIG. 5 is an exploded perspective view of a shutter device.

In FIG. 5, construction of the shutter device is depicted. The shutter device is assembled on a top side of the light-shielded tunnel 43. The shutter device is constituted by a retention lever 80, the shutter drive lever 81, a delay lever 82, the charge lever 83, cam member 84 and a governor mechanism 85. The cam member 84 includes a pivot 84a, a disk having a lock notch 84b, and a semi-circular cam. The semi-circular cam is located below the disk, and has a first cam 86, second cam 87 and a third cam 84c. A boss 90 is formed with the main body 14, and has a hole through which an axial end of the picot 84a is inserted, and secured to an engaging hole 91b of a sprocket wheel 91. The sprocket wheel 91 has a plurality of gears to fit into perforations 19b of the photo filmstrip 19. Thus, when the photo filmstrip 19 is wound, the sprocket wheel 91 and the cam member 84 rotates in the counterclockwise direction.

The shutter drive lever 81 is supported by a pivotal pin 92 of the main body 14 in a rotatable manner, and is biased in the counterclockwise direction by a torsion coil spring 93. The shutter drive lever 81 has a knocker arm 81a for knocking the shutter driving portion 45b of the shutter blade 45, a cam follower hook 81b for contacting the first cam 86, and a driven projection 81c for contacting the delay lever 82.

The retention lever 80 has a combined shape and includes a retention claw 80a, a receiving projection 80b, a release portion 80c and a blocking claw 80d. A pivotal pin 94 is formed on the main body 14 and supports the retention lever 80 in a rotatable manner. A torsion coil spring 95 is disposed below the retention lever 80, and biases the retention lever 80 in the clockwise direction. The retention claw 80a enters the lock notch 84a of the cam member 84 to retain the retention lever 80. A pressing segment 24a (See FIG. 6), formed below the shutter release button 24, presses the release portion 80c when the shutter release button 24 is depressed, and rotates the retention lever 80 in the counterclockwise direction.

The delay lever 82 is rotatably attached to a pivot 96 provided with the light-shielded tunnel 43, and is biased in the counterclockwise direction by a torsion coil spring 97. The delay lever includes a gear portion 82a, a retention pin 82b, a retention projection 82c and a cam follower projection 82d. The retention projection 82c comes in contact with the receiving projection 80b of the retention lever 80. The cam follower projection 82d comes in contact with the outer surface of the third cam 84c. The retention pin 82b is formed below a leading end of a semi-circular shaped arm portion that is extended from one end of the gear portion 82a. An end portion 82e is provided in the opposite side of the gear portion 82a with respect to the pivot of the delay lever 82. The end portion 80e enters a rotation orbit of the driven projection 81c of the shutter drive lever 81, and holds it. Before shutter charge operation, the retention pin 82b presses one contact of the photometry switch 56 to prevent to turn on the photometry switch 56.

The governor mechanism 85 is consisted by a switch gear 98 and an anchor 99, and disposed on an upside of the light-shielded tunnel 43. The switch gear 98 is meshed with the gear portion 82a of the delay lever 82, and rotates together with the delay lever 82. The rotational speed of the switch gear 98 is adjusted by the anchor 99. A retention rib 98a is formed on a bottom surface of the switch gear 98, and a photometry pin 98b is formed on a top surface of the switch gear 98. Rotation of the switch gear 98 makes the photometry pin 98b press the photometry switch 56 to turn on it.

The charge lever 83 has a rough L-shape, and is supported on an upside of the light-shielded tunnel 43. A torsion coil spring 89 biases the charge lever 83 in the counterclockwise direction. An arm portion 83a and a retention projection 83b are formed on an top surface of the charge lever 83. On a leading end of the arm portion 83a is provided a contact surface 83c, which comes in contact with a lateral surface of the switch gear 98. In addition, a receiving projection 83d is provided on a bottom portion of the arm portion 83a. When the cam member 84 rotates, the second cam 87 presses the contact surface of the charge lever 83, which is rotated in the clockwise direction. The receiving projection 83d comes in contact with the retention rib 98a, by which the charge lever 83 is prevented from rotating in the counterclockwise direction by the bias of the torsion coil spring 89. The retention projection 83b comes in contact with the receiving projection 54b of the stop changeover lever 54.

Figure 6:
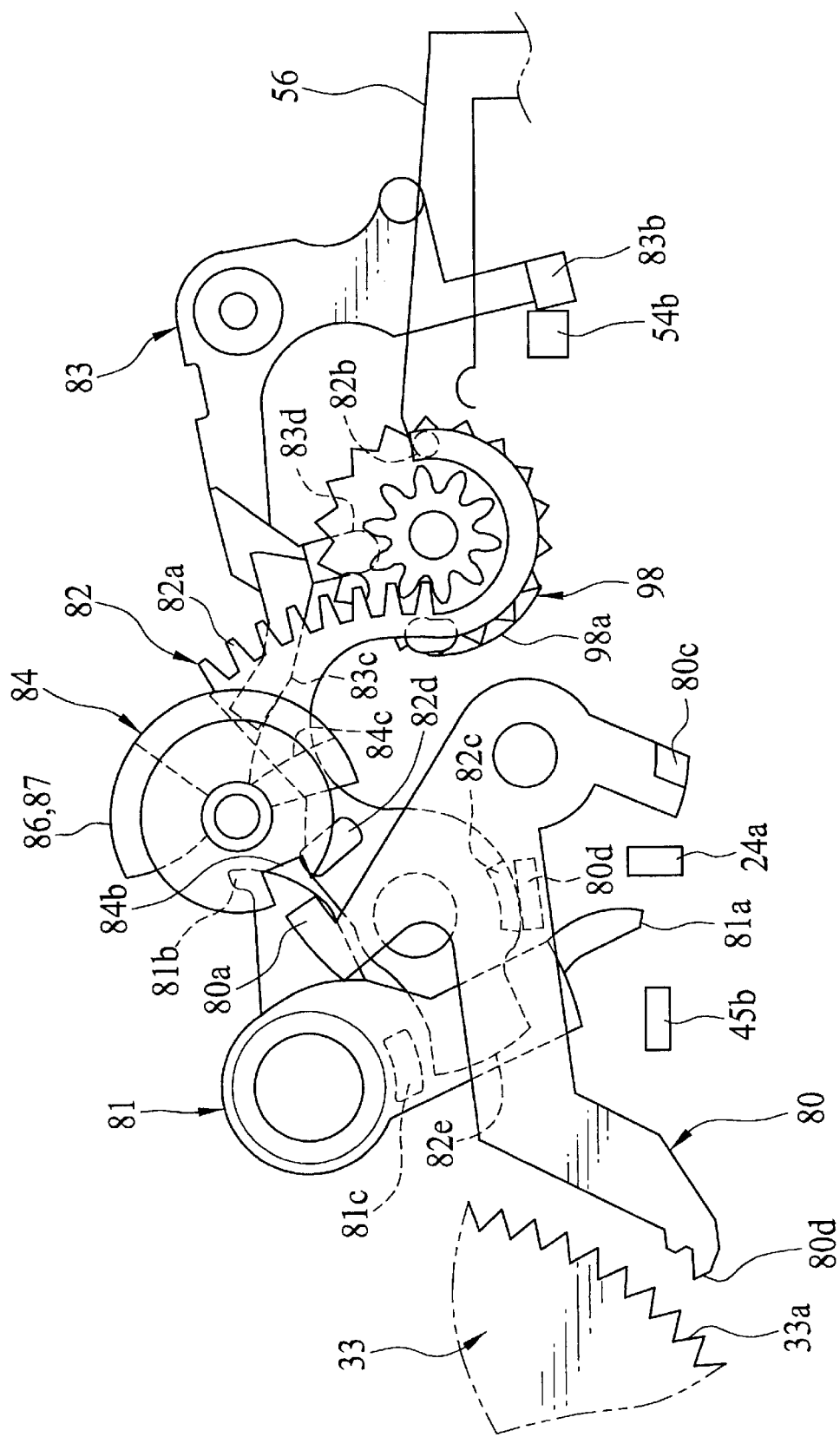
FIG. 6 is a top plan view of a state of the shutter device before a charging operation.
Figure 7:
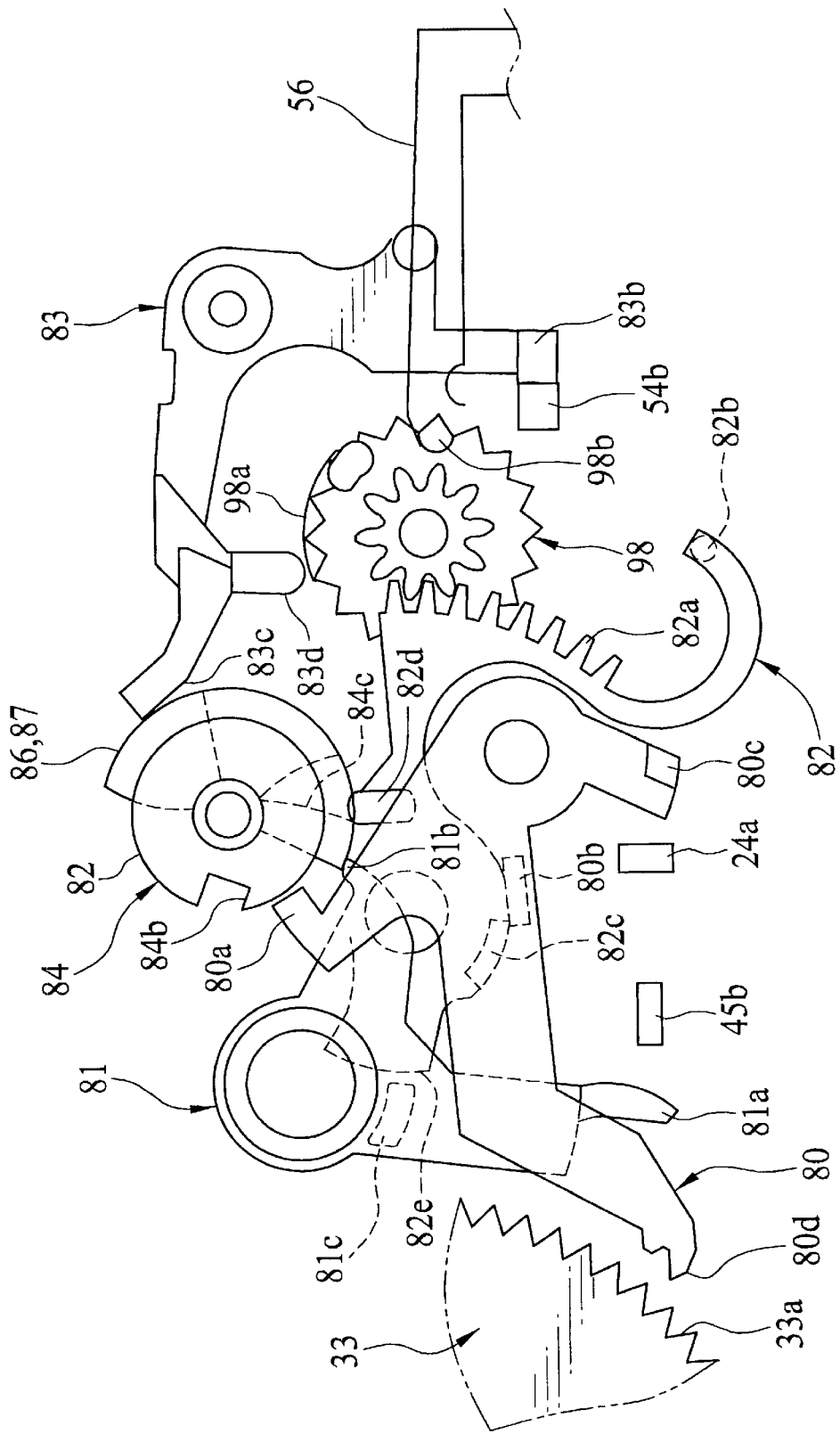
FIG. 7 is a top plan view of a state of the shutter device of which a shutter drive lever is charged.
Figure 8:
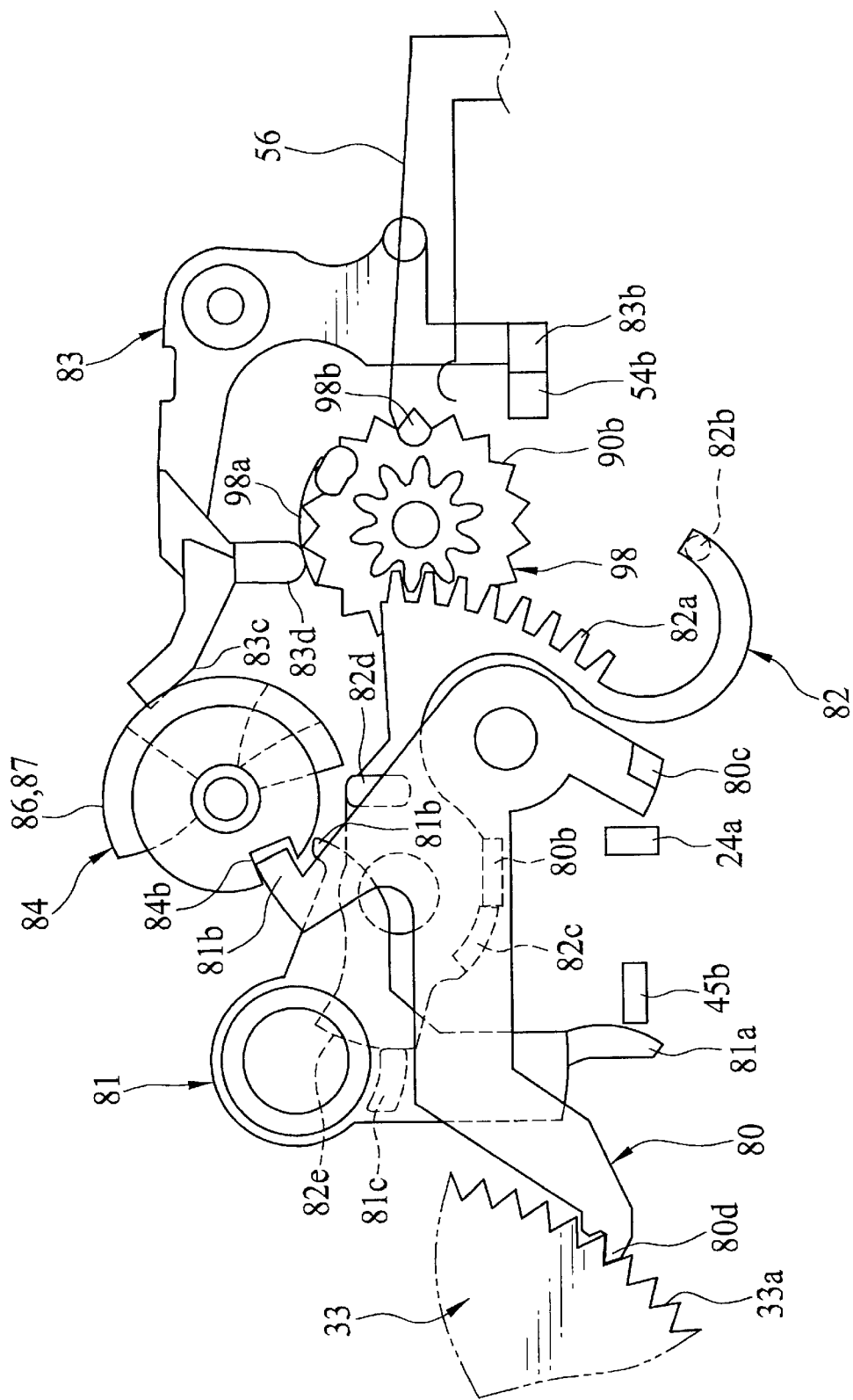
FIG. 8 is a top plan view of a state of the shutter device after the charging operation.

Next, referring FIGS. 6 to 12, operation of the shutter device and the automatic stop changeover device are described. In FIGS. 6 to 8, the anchor 98 and kinds of spring members are omitted for the purpose of simplification of the drawings. In FIG. 6, the shutter unit before the shutter charge operation is depicted. The receiving projection 80b of the retention lever 80, biased in the clockwise direction, comes in contact with the retention projection 82c of the delay lever 82, so the retention lever 80 is retained at an initial position where the blocking claw 80d is away from engaging grooves 33a of the winding wheel 33. The charge lever 83, biased in the counterclockwise direction, is retained by the switch gear 98 that comes in contact with the contact surface 83c of the charge lever 83. At the same time, the retention projection 83c is apart from the projection 54b of the stop changeover lever 54. Moreover, the retention pin 82b of the delay lever 82 presses the upper contact of the photometry switch 56 upward, to ensure to turn off the photometry switch 56. Thereby, the photometry switch 56 is never turned on even when a shock or an external force is applied to the film unit 11.

When the photo filmstrip 19 is advanced, the cam member 84 makes a counterclockwise rotation with the sprocket wheel 91. The first cam 86 presses the cam follower hook 81b of the shutter lever 81, which is rotated in the clockwise direction. Then, the driven projection 81c is away from the rotational orbit of the end portion 82e of the delay lever 82, to allow rotation of the delay lever 82 in the clockwise direction. And the second cam 87 presses the contact surface 83c of the charge lever 83, which is rotated in the clockwise direction against the bias of the torsion coil spring 89. In FIG. 7, the third cam 84c presses the cam follower projection 82d, to rotate the delay lever 82 in the clockwise direction. Upon rotation of the delay lever 82 by a predetermined amount, the retention projection 82c is disengaged from the receiving projection 80b of the retention lever 80, which is rotated in the clockwise direction in FIG. 8. When the photo filmstrip 19 is wound just by one frame, the retention claw 80a enters the lock notch 84a of the cam member 84. At the same time, the blocking claw 80d is engaged with the engaging groves 33a of the winding wheel 33, which is prohibited its rotation. The delay lever 82, biased in the counterclockwise direction, is retained by the receiving projection 80b of the retention lever 80 that engages with the retention projection 80b of the delay lever 80.

BY the rotation of the delay lever 82 in the clockwise direction, the switch gear 98 rotates in the counterclockwise direction, and the retention rib 98a is located in the rotational orbit of the receiving projection 83d of the charge lever 83. When the cam member 84 reaches a position shown in FIG. 8, the contact surface 83c is disengaged from the second cam 87, and the charge lever 83 rotates in the counterclockwise direction. And the charge lever 83 is retained at a position where the receiving projection 83d comes in contact with the outer surface of the retention rib 98a.

Figure 9:
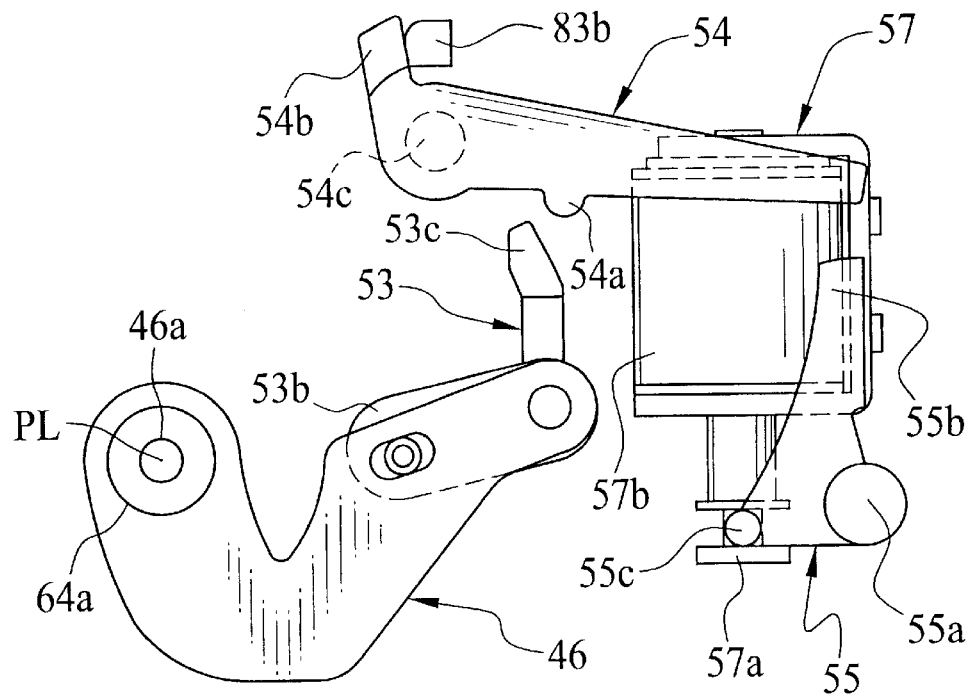
FIG. 9 is a front elevation view of a state of the exposure unit in which a charge lever is charged.

In the middle of rotation of the charge lever 83 in the clockwise direction, the retaining projection 83b presses the receiving projection 54b of the stop changeover lever 54, which rotates toward an initial position, shown in FIG. 9, against the bias of the torsion coil spring 59. In a charged state, the retention projection 83b of the charge lever 83 holds the receiving projection 54b of the stop changeover lever 54, which is retained at the initial position to be away from rotation orbit of the first stop lever 53. At that time, the first stop plate 46 is not biased by the stop changeover lever 54, and is kept at the insert position by the bias of the spring 58.

When the shutter release button 24 is depressed at the charged state, the pressing segment 24a of the shutter release button 24 presses the release portion 80c of the retention lever 80, which rotates in the counterclockwise direction against the bias of the torsion coil spring 95. Then, the receiving projection 80b of the retention lever 80 is disengaged from the retention projection 82c of the delay lever 82, which rotates in the counterclockwise direction by the bias of the torsion coil spring 97. The switch gear 98 rotates together with the delay lever 82, by which the photometry pin 98b presses down the contact of the photometry switch 56. The photometry switch 56 is turned on to drive the photometry circuit, which carries out measurement of subject luminance. Thereby, since the photometry circuit is driven only during the photographing operation, it is possible to save the battery 40.

When the delay lever 82 rotates in the counterclockwise direction, the retention rib 98a is apart from rotational orbit of the receiving projection 83d of the charge lever 83, which rotates in the counterclockwise direction by the bias of the torsion coil spring 89. Thereby, the retention projection 83b of the charge lever 83 is away from the receiving projection 54b of the stop changeover lever 54, which begins rotation in the clockwise direction.

Figure 10:
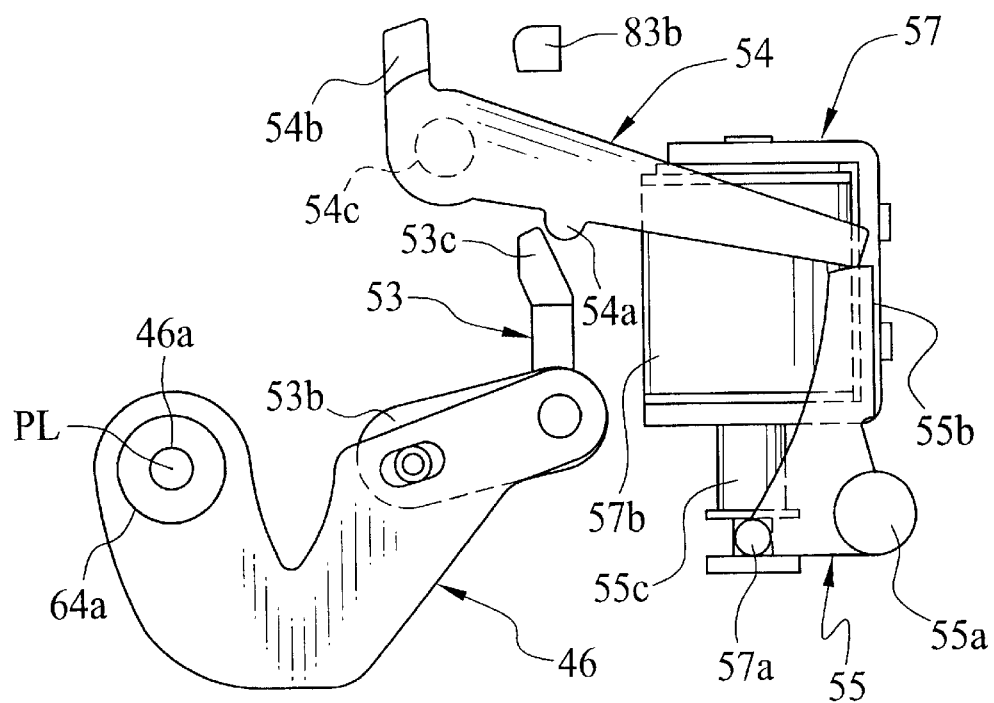
FIG. 10 is a front elevation view of a state of the exposure unit immediately after a shutter release operation in a high luminance condition.

When measured subject luminance is equal to or more than a predetermined level, a current is not conducted through the solenoid 57, so the stopper 55 is hold at the retain position. As shown in FIG. 10, the stop changeover lever 54 rotates slightly in the clockwise direction, and is retained by the stopper 55. Since the first stop lever 53 is not pressed by the stop changeover lever 54, the first stop plate 46 is kept at the insert position.

Figure 11:
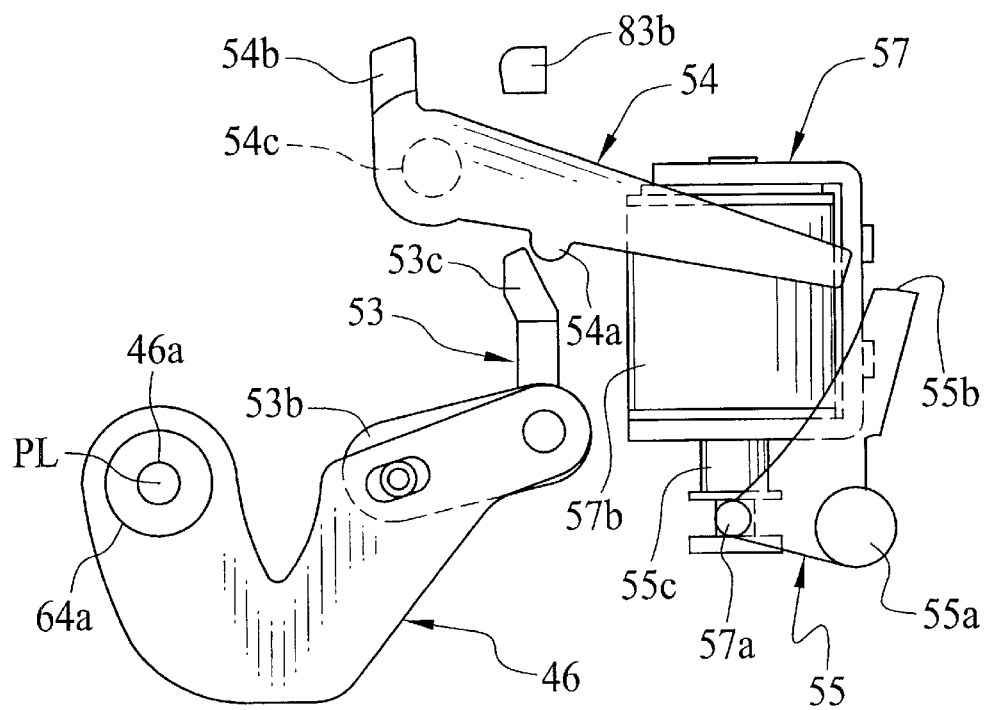
FIG. 11 is a front elevation view of a state of the exposure unit immediately after a shutter release operation in a low luminance condition.
Figure 12:
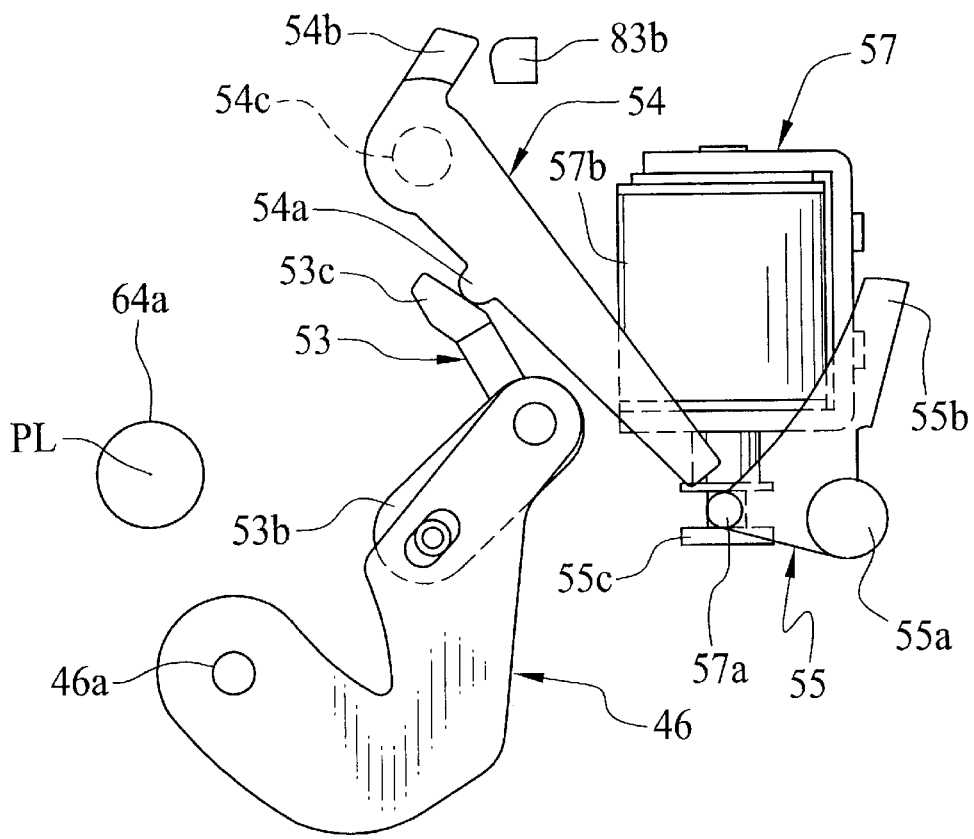
FIG. 12 is a front elevation view of a state of the exposure unit in which a first stop plate is moved.

On the other hand, when measured subject luminance is less than the predetermined level, a current is flown through the solenoid 57. In FIG. 11, the stopper 55 moves to the non-retain position, to allow rotation of the stop changeover lever 54 in the clockwise direction. In that case, as shown in FIG. 12, the stop changeover lever 54 presses the first stop lever 53. Thereby, the first stop plate 46 is moved to the retract position.

When the delay lever 82 rotates by a certain amount, the end portion 82e is disengaged from the driven projection 81c of the shutter drive lever 81, which begins rotation in the counterclockwise direction. Then, the knocker arm 81a knocks the shutter blade 54, by which photo filmstrip 19 is exposed to subject light for a predetermined time. Rotational speed of the delay lever 82 is adjusted by the governor mechanism 85 and a frictional force between the end portion 82e and the driven projection 81c of the shutter drive lever 81, such that the delay lever 82 is disengaged from the shutter drive lever 81 after movement of the first stop plate 46 is completed.

Figure 13:
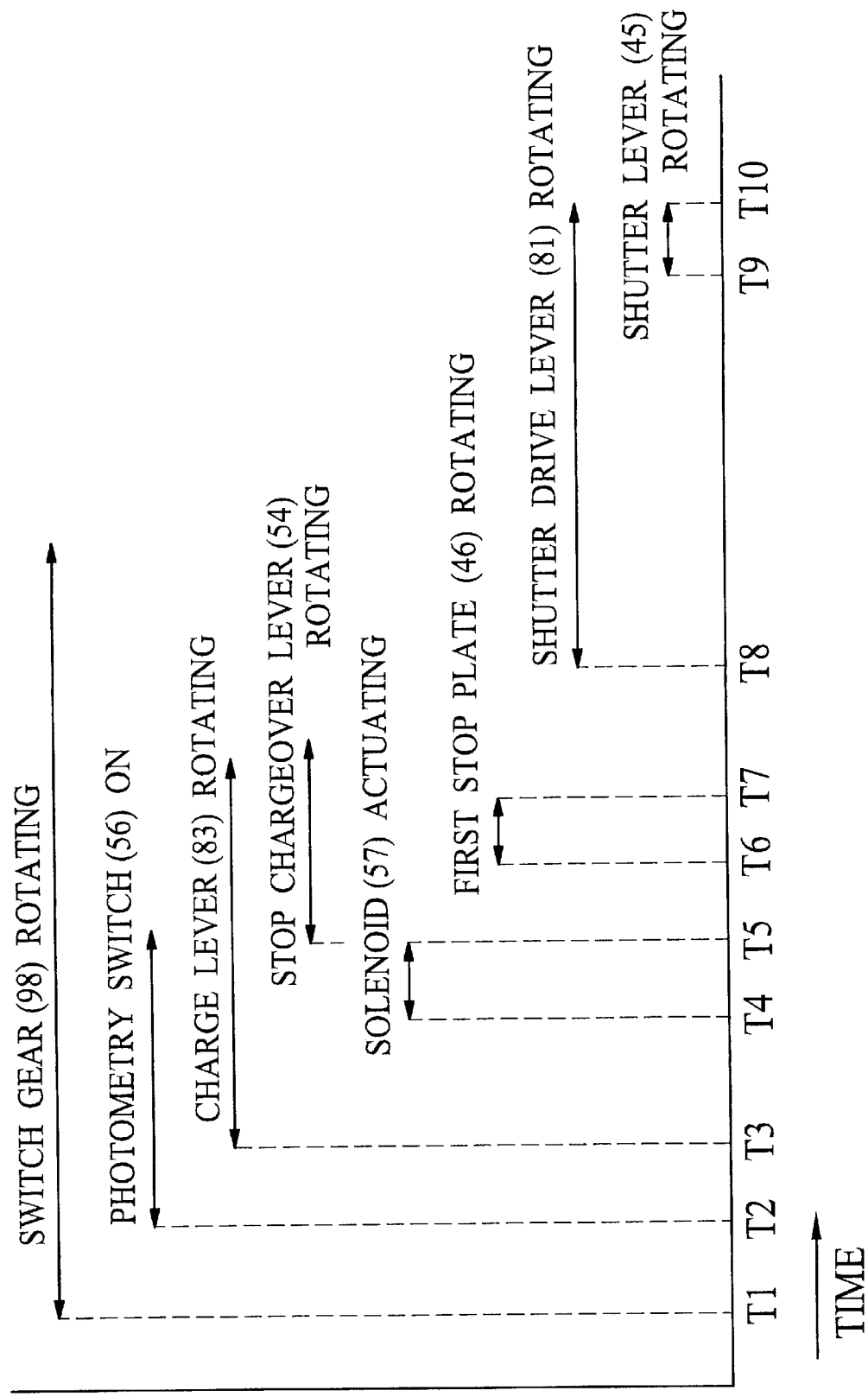
FIG. 13 is a time chart of an operation of the exposure unit.

A time chart of the exposure control device is depicted in FIG. 13, in which subject luminance is lower than the predetermined level in consideration of movement of the first stop plate 46. When the shutter release button 24 is depressed, the retention lever 80 rotates to disengage from the delay lever 82, and stops its rotation. Then, the delay lever 82 begins rotating together with the switch gear 89 at the time T1. By the rotation of the switch gear 89, the photometry switch 56 is turned on at the time T2, to carry out measurement of subject luminance. Thereafter, the charge lever 83 begins rotating at the time T3.

A current is conducted through the solenoid 57 in the interval between T4 and T5, which rotates the stopper 55 to the non-retain position from the retain position. The governor mechanism 85 and the frictional force at the end portion 82e of the delay lever 82 adjust the time to move the charge lever 83, which is away from the stop changeover lever 54 after the time T5 when the stopper 55 completes its rotation. Then, the first stop plate 46 rotates to the retract position during the period in the period between T6 and T7. Afterward, the shutter drive lever 81, delayed its rotation by the governor mechanism 85 and the frictional force at the end portion 82e of the delay lever 82, starts rotation at the time T8. Thereby, the shutter blade 45 is rotated to perform exposure in the period between T9 and T10.

Figure 14:
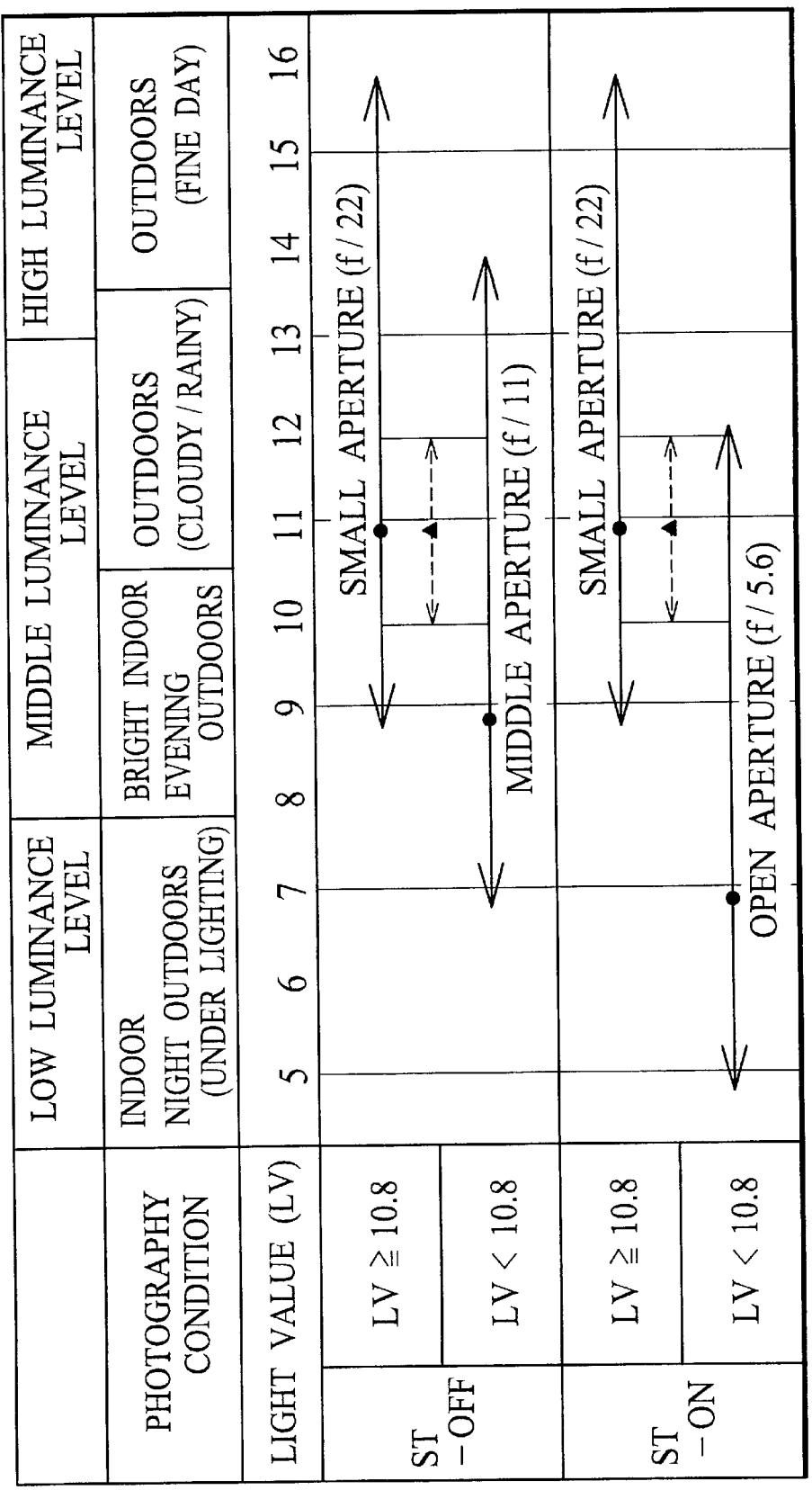
FIG. 14 is a table showing a proper luminance range in respective stop openings.
Figure 16A:
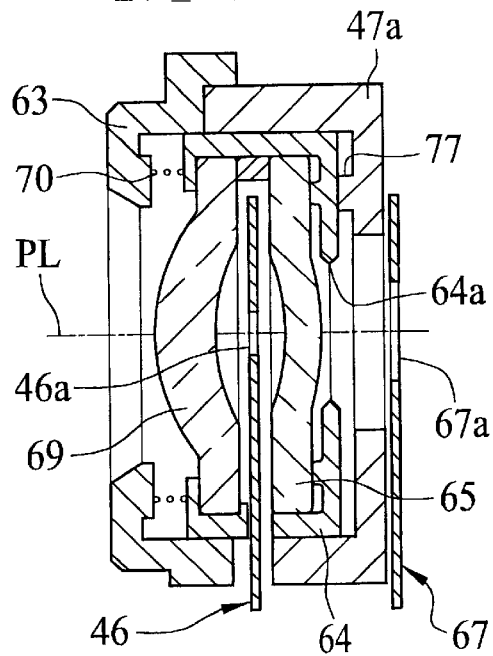
FIGS. 16A to 16D are sectional views of an another preferred lens unit.
Figure 16B:
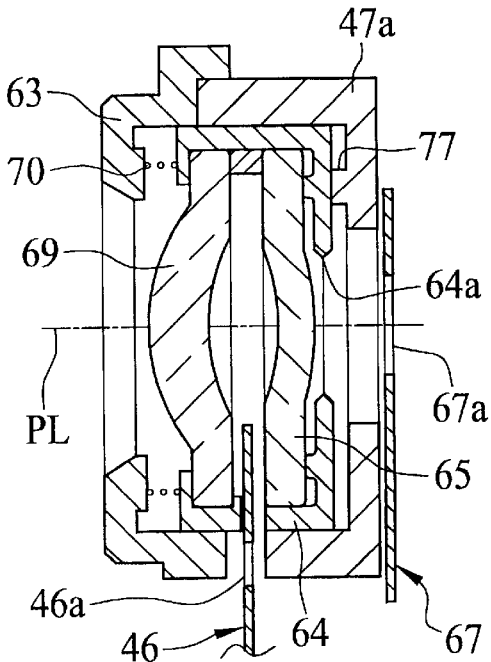
Figure 16C:
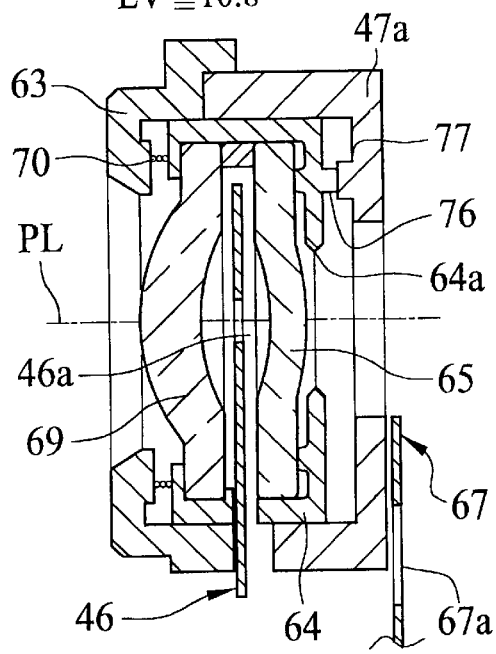
Figure 16D:
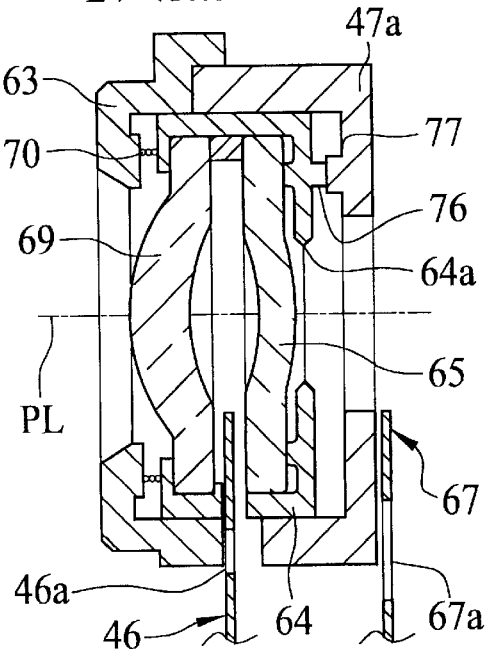
Figure 18A:
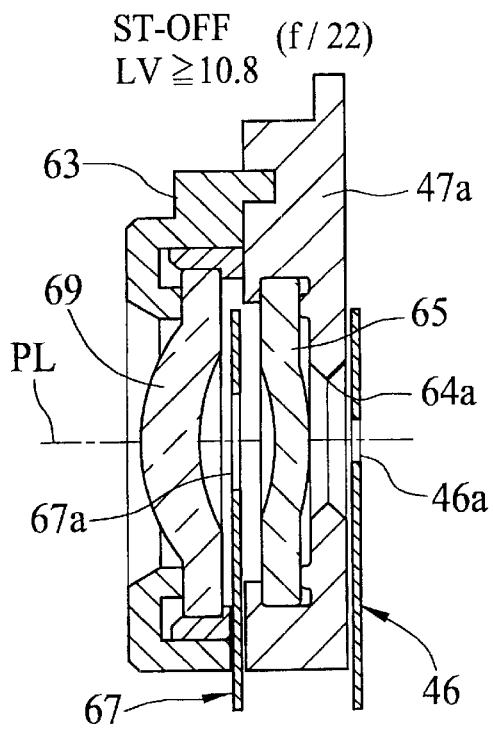
FIGS. 18A to 18D are sectional views of a further another preferred lens unit.
Figure 18B:
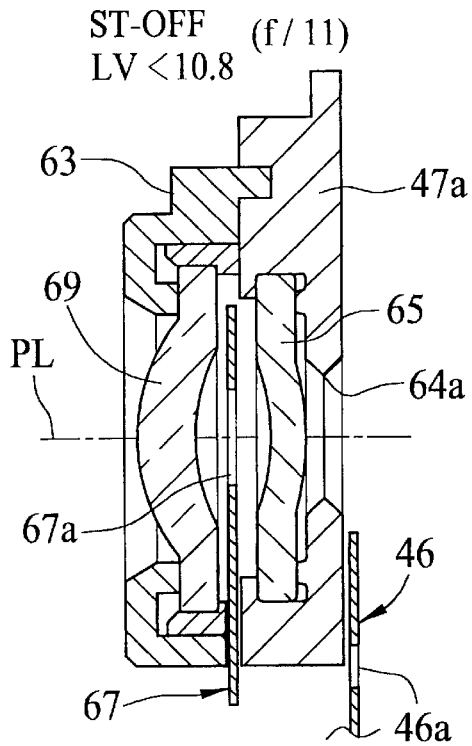
Figure 18C:
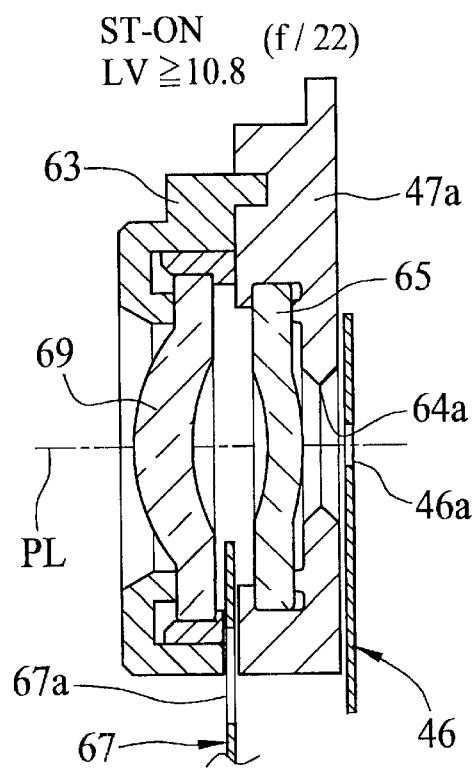
Figure 18D:
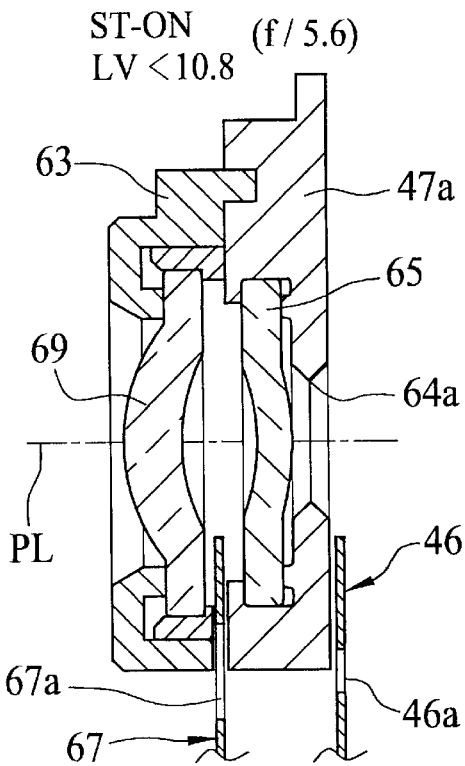

FIG. 14 shows a table to represent proper luminance range of the open aperture (the large stop opening 64a), the middle aperture (the middle stop opening 67a), and the small aperture (the small stop opening 46a). The f-number of the open aperture (when only the large stop opening 64a is inserted on the photographic light path PL) may be determined within a range of 4.0 to 5.6. In this embodiment, the open aperture of f/5.6 is used. In that case, the light value LV for obtaining optimum exposure amount is about 6.9. The open aperture is designed to be set when the flash unit 13 is activated. Since the capacity of the mai n capacitor 35 is small, the open aperture with the f-number of 5.6 can make up for the deficit of flash light amount.

When a photo filmstrip 19 has a latitude of −2 to +5 in light value, light value for proper exposure amount by use of the open aperture is from 4.9 to 11.9. Light value of 4.9 corresponds to the luminance in indoor photography or outdoor photography at night (under lightings). Light value of 11.9 corresponds to the luminance of outdoor photography in rainy or cloudy daytime. Thereby, it is possible to perform proper exposure even in an extremely low luminance condition (light value is about 5).

The f-number of the middle stop opening 67a may be determined within a range of 8 to 11. In the embodiment, the middle stop of f/11 is used. In that case, light value for obtaining appropriate exposure amount is about 8.8. Considering the latitude of the photo filmstrip 19, it is possible to obtain an appropriate print image in a range of light value from 6.8 to 13.8.

The middle stop opening 67a is used in photographing a subject of the middle luminance level. As described above, it is difficult to make a decision to use flash light. Therefore, the applicant made a research to determine luminance level at which a user judges to use flash light. As a result, it is found that approximately half of subjects do not need flash light in the evening outdoors or in the bright office (light value LV is from 8 to 9).

The f-number of the middle stop opening 67a is determined on the basis of the research result, for having an appropriate exposure amount in a range where most users do not need flash light (light value LV is from 8 to 9). Thereby, it is possible to prevent inappropriate exposure by failure judgment, and to provide a user-friendly film unit.

Moreover, the research result shows that most users judges to use flash light in the low luminance level, such as night photography or indoor photography, where image quality of long-distance subject is not mattered. In consideration of compensation of light amount, rather than of keeping pan-focus for the purpose of focusing long-distance subject, the f-number of the open aperture, used in the low luminance level, is set to 5.6.

The f-number of the small stop opening 46a may be determined within a range of 16 to 27. In this embodiment, the small stop opening 46a of f/22 is used. In that case, light value for obtaining appropriate exposure amount is about 10.8. Considering the latitude of the photo filmstrip 19, it is possible to obtain an appropriate print image in the luminance range from 8.8 to 15.8 in light value LV. The light value of 8.8 corresponds the evening outdoors, and indoors under bright light. The light value of 15.8 corresponds outdoors on fine day. Moreover, by using an aperture of f/22, it is possible to prevent under exposure when a user performs flash photography by mistake in photographing a subject of the high luminance level.

These f-numbers are chosen under the condition where film speed of the photo filmstrip 19 is ISO 3200, and where shutter speed is 1/100 sec. So, these f-numbers may be chosen in accordance with film speed and shutter speed. For instance, f-number of the open aperture may be increased for the purpose of keeping pan-focus. In that case, slowing shutter speed makes it possible to compensate deficiency of light amount. In FIG. 14, there are black triangle marks that indicate changeover points (light value LV is 10.8) to activate the solenoid 57. Because of inaccuracy of the CdS element 26, the changeover point may be deviated within a range of 9.8 to 11.8, shown by dotted lines. The changeover point may be determined within a range in light value from 10.5 to 11.5, in consideration of use and purpose.

Next, operation of the above configuration will be described. In a state where the operation member 27 is at the OFF position (ST-OFF), when a measured subject luminance is equal to or more than a predetermined level (light value LV is 10.8), the first and second stop plates 46, 67 are set at insert positions, as shown in FIG. 15A. In that case, exposure is performed through the small aperture (f/22). When the measured subject luminance is less than the predetermined level, the first stop plate 46 moves to the retract position, so the middle aperture is set on the photographic light path PL (f/11), as shown in FIG. 15B.

In case of turning off the flash unit 13, the f-number is automatically changed between 11 and 22, according to measured subject luminance. Thereby, it is possible to have proper exposure amount in the middle and high luminance levels. Moreover, by setting the f-number of the middle stop opening 67a as 11, it is possible to have proper exposure amount without flash light in a luminance level (light value is from 8 to 9), where most users judge it unnecessary to use flash light. So, it is possible to prevent under exposure in non-flash photography.

When the operation member 27 is at the OFF position, the cam pins 76 are away from the cam members 77, so tension spring 70 sets the taking lens 20 at the long-distance position to focus on a subject 4.5 m to 7 m apart. Thereby, it is possible to make much of image quality of long-distance subject in outdoor photography, in which flash light is not needed.

When judging that a subject is dark, the user moves the operation member 27 to the ON position for carrying out flash photography (ST-ON). Then, the second stop plate 67 is moved to the retract position. When the measured subject luminance is equal to or more than the predetermined level (light value LV is 10.8), the small stop is set on the photographic light path PL (f/22), as shown in FIG. 15C. In that case, exposure is performed through the small aperture. Thus, it is possible to prevent over exposure even when a user carries out flash photography by mistake.

On the other hand, when the measured subject luminance is less than the predetermined level (LV=10.8), the first stop plate 46 moves to the retract position, as shown in FIG. 15D. In that case, exposure is performed through the open aperture (f/5.6). Accordingly, it is possible to have appropriate exposure amount in the low luminance level, such as indoor or night photography. In the low luminance level, most users think it necessary to use flash light, and never forget to turn on flash circuit. Thus, under exposure is not occurred by a failure judgment of subject luminance.

By moving the operation member 27 to the ON position, the lens holding frame 64 is rotated, by which the cam pins 76 are moved to come in contact with the top surfaces of the cam members 77. Thereby, the taking lens 20 is moved forward along the photographic light path PL, and is set at the short-distance position to focus on a subject 1.5 m to 2.0 m apart. This range in distance is nearer than the reachable distance of flash light, so it is possible to have a fine print picture even in indoor or night photography.

In this way, by providing three kinds of aperture, the open aperture, the middle aperture and the small aperture, proper light amount may be obtained in whole luminance range from the low luminance level to the high luminance level. The f-number of the open aperture is smaller than the conventional one for the purpose of compliment of deficiency of flash light, but pan-focus of the taking lens 20 is kept by providing the small and middle apertures that have large depths in field. Thus, in photographing subjects of middle and high luminance level, it is possible to obtain a print picture in which subjects from short distance to long distance are focused.

In consideration of distortion of the taking lens 20, it is preferable to dispose apertures between the front and rear lenses 69, 65. In the preferred embodiment, the second stop plate 67 with the middle stop opening 67a is located between the front and rear lenses 69, 65, because the middle aperture seems to be used most.

Still, as shown in FIGS. 16A to 16D, the first stop plate 46 may be disposed between the front and rear lenses 69, 65, and the second stop plate 67 may be positioned behind the taking lens 20. In that case, the small aperture is located between the front and rear lenses 69, 65, so distortion of the taking lens 20 is decreased when the small stop opening 67a is inserted on the photographic light path PL. Locations of the stop opening is not limited by the above embodiments, the first and second stop plates 46, 67 may be provided between the front and rear taking lenses 69, 65, or in front of the taking lens 20. In order to control exposure amount, a liquid crystal panel may be substituted for the stop plate.

In the above embodiment, the open aperture of f/5.6 used, which may cause shallow depth of field. In that case, it is needed to correct image quality deterioration in printing an image. The open aperture is set on the photographic light path PL in photographing a subject of low luminance level by use of the flash unit 13. Thus, information recording means may be provided with the film unit 11, for recording information in that case. Thereby, a photo printer can automatically detect whether or not image correction is needed.

One example of the image recording means is a data exposure unit. The data exposure unit exposes an optical mark onto the photo filmstrip 19 (IX 240 type is preferable), and includes a light source, a light guide 102, an indicator frame 103, a focusing lens 104 and an opening 105, as shown in FIG. 17. Flash light leaked in the film unit 11 is used as the light source. The light guide 102 is disposed in front of the first stop plate 46, and guides leaked flash light through the indicator frame 103 toward the opening 105 formed through the front surface of the light-shielded tunnel 43. The focusing lens 104 is disposed between the first stop plate 46 and the light guide 102. When flash light is emitted, leaked flash light is projected toward the photo filmstrip 19 through the indicator frame 103 and the light guide 102. In photographing a subject of low luminance level, the first stop plate 46 is moved to the retract position, so the flash light from the light guide 102 is exposed onto an external area of the exposure area 19a through the focusing lens 104 and the opening 105. Thereby, an open-aperture utilization mark 106 is recorded onto the photo filmstrip 19. A photo printer tries to read out the open-aperture utilization mark 106, to identify whether or not to correct image quality of respective frames.

In photographing a subject of high luminance level, the first stop plate 46, retained at the insert position, is located between the light guide 102 and the opening 105. In that case, flash light from the light guide 102 is blocked off by the first stop plate 46, so the open-aperture utilization mark 106 is not recorded onto the photo filmstrip 19. Accordingly, it is possible to record an utilization mark in photography through only the large stop opening 64a. Instead of optical recording, flash indicator mark may be recorded magnetically onto the photo filmstrip 19. In addition, by detecting the position of the operation member 27, it is possible to identify to use flash light. In that case, information concerning the position of the operation member 27 may be recorded on the photo filmstrip 19 by use of an exclusive light emitting diode (LED). In the above embodiment, the utilization mark is recorded in a bottom right side of the exposure area 19a. But the utilization mark may be recorded in any position of outside of the exposure area 19a.

In the above embodiments, both the front and rear lenses 69, 65 of the taking lens 20 are moved back and forth along the photographic light path PL, but only the front lens 69 may be moved along the photographic light path PL. The taking lens 20 is set either at the short-distance position or at the long-distance position, but the taking lens 20 may be set either at the short-distance position or at a normal-distance position to focus on a subject between the long and short distance. Moreover, the taking lens 20 may be set either at the long-distance position or at the normal-distance position. Furthermore, as shown in FIGS. 18A to 18D, the lens holding frame 64 may be omitted to provide a taking lens 20 of fixed-focus type, which has the subject distance of 2.5 m to 3.5 m. In that case, decreasing aperture size makes it possible to keep pan-focus for focusing in a range from short-distance to infinity.

Figure 19:
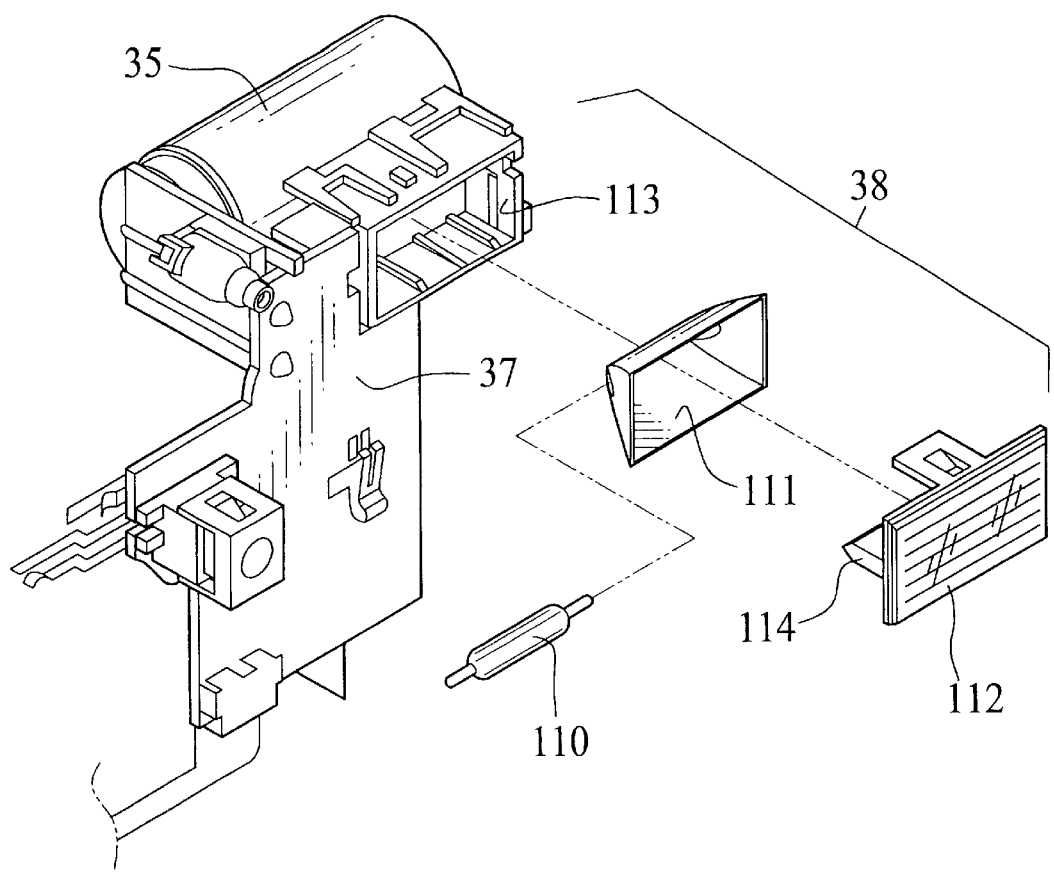
FIG. 19 is an exploded perspective view of a flash emitter.
Figure 20:
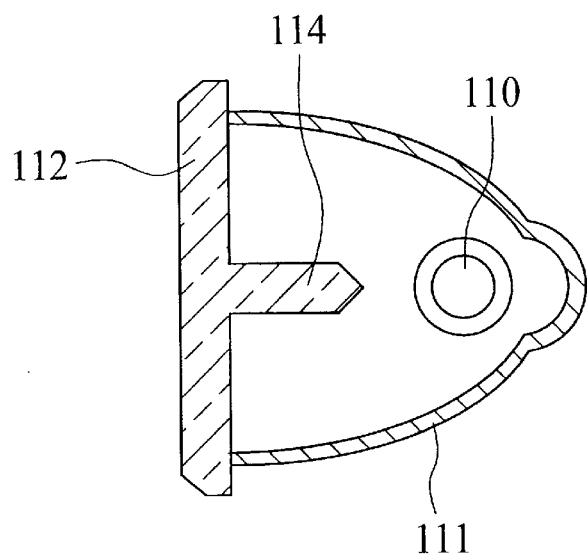
FIG. 20 is a sectional view of the flash emitter of FIG. 19.

In order to prevent reduction in marginal luminance, a ridge may be provided inside of the flash emitter 38. In FIGS. 19 and 20, the flash emitter 38 includes a flash discharge tube 110 for emitting flash light, a reflector 111 for reflecting flash light forward, and a protector 112 for diffusing flash light and protecting the flash discharge tube 110 from dust or flaw. The flash discharge tube 110, the reflector 111 and the protector 112 are contained in a reflector case 113 mounted on the circuit board 37. A ridge 114 is formed on a rear surface of the protector 112, and projected horizontally toward the flash discharge tube 110. The ridge 114 has a width almost the same as the length of the flash discharge tube 110.

Some of the flash light, projected toward a center of an exposure area, is reflected at the top and bottom surfaces and at a pointed end of the ridge 114. Reflected flash light goes toward an upper or lower marginal area. Thereby, an amount of flash light projected toward the center is decreased, which causes to prevent over exposure of a leading subject, which is tend to be positioned in the center of the exposure area.

In the above embodiment, the photo filmstrip 19 has a speed of ISO 3200, but a photo filmstrip with a lower film speed, such as ISO 800 or ISO 1600 type, is applicable to the present invention. In addition, it is possible to use a photo filmstrip having a speed more than ISO 3200, which is larger in latitude than that of ISO 3200 type. In case of using a photo filmstrip of ISO 1600 type, it is possible to set f-numbers of the open aperture, the middle aperture and the small aperture to 5.6, 8.0 and 16.0, respectively. In that case, a proper exposure range is one step smaller in light value than the above embodiment, but it is possible to construct an effective exposure device. In combining the exposure control device of the present invention with a photo filmstrip of ISO 800 type, which is better in image quality than that of ISO 3200 type, a fine image print may be obtained.

In the above embodiment, the first and second stop plates having the small and middle stop opening respectively are inserted on the photographic light path PL, on which the open aperture (the large stop opening 64a) is located. But the present invention is not limited to the configuration. Instead of the first and the second stop plates, it is possible to provide a third stop plate having the small and large stop openings, and a fourth stop plate having the middle and large stop openings. In that case, either the small aperture or the large aperture is chosen by moving the third stop plate, and either the middle aperture and the large aperture is chosen by moving the fourth stop plate. It is not needed to provide the large stop opening with either the third stop plate or the fourth stop plate.

In the above embodiments, photometry of the subject is carried out by the movement of the delay lever 82 after a shutter release operation, but it is possible to drive the photometry circuit in accordance with half depression of the shutter release button 24, or with the movement of the operation member 27. As the photometry element, a solar cell or a photo diode may be substituted for CdS element 26. The present invention is also applicable to a compact camera as well as the film unit 11.

Thus, the present invention is not to be limited to the above embodiments, but on the contrary, various modifications are possible to those skilled in the art without departing from the scope of claims appended hereto.

What is claimed is:

1. An exposure control device, incorporated in a camera having an open aperture on a photographic light path, said exposure control device comprising:
   a first stop member having a small stop opening that is smaller than said open aperture, said first stop member being movable between a small aperture position where said small stop opening is set on said photographic light path, and a first large aperture position where said small stop opening is retracted from said photographic light path;
   a second stop member having a middle stop opening that is larger than said small stop opening and smaller than said open aperture, said second stop member being movable between a middle aperture position where said middle stop opening is set on said photographic light path, and a second large aperture position where said middle stop opening is retracted from said photographic light path;
   photometry means for measuring subject luminance;
   first stop changeover means for setting said first stop member to either said small aperture position or said first large aperture position in accordance with said subject luminance measured by said photometry means; and
   second stop changeover means for setting said second stop member either to said middle aperture position or said second large aperture position in accordance with selecting operation to decide whether or not to carry out flash photography.

2. An exposure control device as claimed in claim 1, wherein said camera has a taking lens, said taking lens comprising a plurality of lens elements, one of said first stop member and said second stop member being disposed between said lens elements, and the other stop member being disposed behind said taking lens.

3. An exposure control device as claimed in claim 2, wherein said second stop member is retained at said middle aperture position, said second stop changeover means moving said second stop member to said second large aperture position in accordance with operation to drive a flash unit of said camera.

4. An exposure control device as claimed in claim 3, wherein said second stop changeover means comprises:
   a operation member for driving said flash device;
   a first changeover lever that is provided with said operation member; and
   a changeover member that is rotatable and comes in contact with said first changeover lever, said second stop member being fixed to said changeover member;
   wherein said changeover member rotates to change the position of said second stop member by movement of said operation member.

5. An exposure control device as claimed in claim 4, wherein said first stop member is kept at said small aperture position, and said first stop changeover means moves said first stop member to said first large aperture position when said subject luminance is less than a predetermined value.

6. An exposure control device as claimed in claim 5, wherein said photometry means is driven by shutter release operation.

7. An exposure control device as claimed in claim 6, wherein said taking lens is movable between a short-distance position where the subject distance is ranged from 1.5 m to 2 m, and a long-distance position where the subject distance is ranged from 4.5 m to 7 m.

8. An exposure control device as claimed in claim 7, wherein said taking lens is set at said short-distance position in choosing flash photography, and set at long-distance position when flash photography is not selected.

9. An exposure control device as claimed in claim 8, wherein said taking lens is set at either said short-distance position or said long-distance position in accordance with movement of said operation member.

10. An exposure control device as claimed in claim 9, wherein said camera comprises:
    a lens holder that is fixed to said camera;
    a lens holding frame for containing said taking lens, said lens holding frame being rotatable in said lens holder;
    a connection lever provided with said lens holding frame;
    a second changeover lever provided with said operation member, said second changeover lever coming in contact with said connection lever;
    cam pins disposed in a rear surface of said lens holding frame; and
    cam members disposed in a front surface of said lens holder, said cam members being tapered off;
    wherein said second changeover lever presses said connection lever to rotate said lens holding frame by movement of said operation member, said lens holding frame moving along said photographic light path by moving said cam pins along said tapered surface of said cam members.

11. An exposure control device as claimed in claim 6, wherein the subject distance of said taking lens is ranged from 2 m to 4 m.

12. An exposure control device as claimed in claim 10, wherein said camera is a lens-fitted photo film unit having a photo filmstrip and a shutter device of same shutter speed, the film speed of said photo filmstrip being more than ISO 1600,
    wherein the f-number of said open aperture is set within a range of 4.0 to 5.6, the f-number of said middle stop opening is set within a range of 8 to 11, and the f-number of said small stop opening is set within a range of 16 to 27.

13. An exposure control device as claimed in claim 12, wherein said predetermined level of said subject luminance is determined within a range of 10.5 to 11.5 in light value.

14. An exposure control device as claimed in claim 12, wherein said lens-fitted photo film unit has recording means for recording open-aperture information on a marginal area of a corresponding frame of said photo filmstrip in photographing through only said open aperture.

15. An exposure control device as claimed in claim 12, wherein said flash unit comprises:
- a flash discharge tube for emitting flash light, said flash discharge tube being extended along a width direction of said lens-fitted photo film unit;
- a reflector for reflecting flash light from said flash discharge tube forward;
- a transparent protector for covering a front portion of said reflector; and
- a rib provided with said protector, said rib being extended along said width direction, some of flash light emitted toward center of a photography area being reflected by said rib, reflected flash light going toward upper and lower portion of said photography area.

16. An exposure control device as claimed in claim 11, wherein said camera is a lens-fitted photo film unit having a photo filmstrip and a shutter device of same shutter speed, the film speed of said photo filmstrip being more than ISO 1600,
- wherein the f-number of said open aperture is set within a range of 4.0 to 5.6, the f-number of said middle stop opening is set within a range of 8 to 11, and the f-number of said small stop opening is set within a range of 16 to 27.

17. An exposure control device as claimed in claim 16, wherein said predetermined level of said subject luminance is determined within a range of 10.5 to 11.5 in light value.

18. An exposure control device as claimed in claim 16, wherein said lens-fitted photo film unit has recording means for recording open-aperture information on a marginal area of a corresponding frame of said photo filmstrip in photographing through only said open aperture.

19. An exposure control device as claimed in claim 16, wherein said flash unit comprises:
- a flash discharge tube for emitting flash light, said flash discharge tube being extended along a width direction of said lens-fitted photo film unit;
- a reflector for reflecting flash light from said flash discharge tube forward;
- a transparent protector for covering a front portion of said reflector; and
- a rib provided with said protector, said rib being extended along said width direction, some of flash light emitted toward center of a photography area being reflected by said rib, reflected flash light going toward upper and lower portion of said photography area.

* * * * *